United States Patent
Weiss

(10) Patent No.: US 12,462,017 B2
(45) Date of Patent: Nov. 4, 2025

(54) PROCESSOR ARRANGEMENT FOR MONITORING CONTROL-FLOW INTEGRITY

(71) Applicant: ACCEMIC TECHNOLOGIES GMBH, Kiefersfelden (DE)

(72) Inventor: Alexander Weiss, Kiefersfelden (DE)

(73) Assignee: ACCEMIC TECHNOLOGIES GMBH, Kiefersfelden (DE)

( * ) Notice: Subject to any disclaimer, the term of this patent is extended or adjusted under 35 U.S.C. 154(b) by 500 days.

(21) Appl. No.: 17/553,215

(22) Filed: Dec. 16, 2021

(65) Prior Publication Data

US 2022/0198000 A1 Jun. 23, 2022

(30) Foreign Application Priority Data

Dec. 17, 2020 (EP) .................................... 20214995

(51) Int. Cl.
*G06F 21/54* (2013.01)
*G06F 9/38* (2018.01)
(Continued)

(52) U.S. Cl.
CPC ............ *G06F 21/54* (2013.01); *G06F 9/3806* (2013.01); *G06F 13/1673* (2013.01); *G06F 21/554* (2013.01); *G06F 21/79* (2013.01)

(58) Field of Classification Search
CPC .......... G06F 21/54; G06F 21/55; G06F 21/56; G06F 21/79; G06F 21/554; G06F 21/556;
(Continued)

(56) References Cited

U.S. PATENT DOCUMENTS 8,151,349 B1 * 4/2012 Yee .......................... G06F 21/53
713/165
11,372,969 B1 * 6/2022 Sundahl ................ G06F 21/577
(Continued)

FOREIGN PATENT DOCUMENTS

| EP | 2873983 | 5/2015 |
|---|---|---|
| EP | 3792767 | 3/2021 |
| EP | 3792770 | 3/2021 |

OTHER PUBLICATIONS

De Clercq, R. and Verbauwhede, I., 2017. A survey of hardware-based control flow integrity (CFI). arXiv preprint arXiv:1706.07257. (Year: 2107).*

(Continued)

*Primary Examiner* — James N Fiorillo
(74) *Attorney, Agent, or Firm* — Sheridan Ross PC

(57) ABSTRACT

A processor arrangement, comprising a processor under observation, hereinafter PUO, having a processing unit, which is configured to execute an application program code stored in a memory and to provide application output data via an output interface; an observation unit that is connected to the processing unit and configured to monitor execution of the application program code by the processing unit and to provide execution information indicative of an execution pattern associated with the execution of the application program code by the PUO; a cybersecurity-monitoring engine for observing the PUO, which is inaccessible by the PUO and comprises an observation input interface for receiving the execution information and an execution-monitoring unit, which is configured to perform a comparison between the received execution information and pre-generated execution pattern information and to detect an execution anomaly in the retrieved execution information, and to provide a monitoring output signal indicative of the detected execution anomaly; a controllable latency-output-buffer (Continued)

unit, which is also inaccessible by the PUO and comprises a buffer memory and which receives at least a part of the output data of the PUO and the monitoring output signal, and which is configured to temporarily store the received output data in the buffer memory for a pre-determined latency time span, output the temporarily stored output data from the buffer memory at the end of the latency-time span, if no monitoring output signal indicative of the detected execution anomaly has been received, and to block at least a part of the output from the buffer memory as soon as the monitoring output signal indicative of the detected execution anomaly has been received.

15 Claims, 9 Drawing Sheets

(51) Int. Cl.
    *G06F 13/16*   (2006.01)
    *G06F 21/55*   (2013.01)
    *G06F 21/79*   (2013.01)
(58) Field of Classification Search
    CPC ........ G06F 21/567; G06F 21/755; G06F 9/38; G06F 9/3806; G06F 13/16; G06F 13/1673
    USPC .......................................................... 726/22
    See application file for complete search history.

(56) References Cited

U.S. PATENT DOCUMENTS

| | | | | |
|---|---|---|---|---|
| 11,436,327 | B1* | 9/2022 | Vashisht | G06F 21/54 |
| 11,783,026 | B2* | 10/2023 | Hershman | G06F 21/78 726/22 |
| 2005/0240745 | A1* | 10/2005 | Iyer | G06F 13/1668 711/E12.079 |
| 2013/0298117 | A1* | 11/2013 | Reynolds | H04L 41/082 717/173 |
| 2014/0237595 | A1* | 8/2014 | Sridhara | G06F 21/566 709/224 |
| 2015/0347133 | A1* | 12/2015 | Gschwind | G06F 9/3834 712/239 |
| 2016/0196428 | A1* | 7/2016 | Momot | G06F 21/54 726/23 |
| 2016/0217016 | A1* | 7/2016 | Raman | G06F 9/52 |
| 2017/0286111 | A1* | 10/2017 | Pereira | G06F 11/3466 |
| 2018/0260562 | A1* | 9/2018 | Chen | G06F 16/9024 |
| 2018/0373896 | A1* | 12/2018 | Branco | G06F 9/3005 |
| 2019/0005231 | A1* | 1/2019 | Peleg | G06F 21/54 |
| 2019/0303270 | A1* | 10/2019 | Hoermann | G06F 11/3636 |
| 2020/0159888 | A1* | 5/2020 | Ghose | G06F 12/0842 |
| 2020/0272548 | A1* | 8/2020 | Carrington | G06F 11/261 |
| 2020/0320196 | A1* | 10/2020 | Bi | G06F 9/30061 |
| 2021/0073381 | A1* | 3/2021 | Prvulovic | G06F 21/755 |
| 2021/0263779 | A1* | 8/2021 | Haghighat | G06F 9/5061 |
| 2021/0365554 | A1* | 11/2021 | Sakalis | G06F 9/321 |
| 2022/0019657 | A1* | 1/2022 | Sethumadhavan | G06F 21/53 |
| 2022/0027467 | A1* | 1/2022 | Favor | G06F 9/30189 |
| 2022/0067143 | A1* | 3/2022 | Favor | G06F 12/1063 |
| 2022/0067154 | A1* | 3/2022 | Favor | G06F 21/556 |
| 2022/0067155 | A1* | 3/2022 | Favor | G06F 9/3854 |
| 2022/0067156 | A1* | 3/2022 | Favor | G06F 21/75 |
| 2022/0107784 | A1* | 4/2022 | Favor | G06F 9/30181 |
| 2022/0108013 | A1* | 4/2022 | Favor | G06F 12/1063 |
| 2023/0020547 | A1* | 1/2023 | Katkoori | G06F 21/556 |
| 2023/0092245 | A1* | 3/2023 | Saroiu | H04L 47/22 726/22 |

OTHER PUBLICATIONS

Lee, Y., Lee, J., Heo, I., Hwang, D. and Paek, Y., 2017. Using CoreSight PTM to integrate CRA monitoring IPs in an ARM-based SoC. ACM Transactions on Design Automation of Electronic Systems (TODAES), 22(3), pp. 1-25. (Year: 2017).*

De Clercq, R. and Verbauwhede, I., 2017. A survey of hardware-based control flow integrity (CFI). arXiv preprint arXiv: 1706.07257 (Year: 2017).*

Chen et al. "HeNet: A Deep Learning Approach on Intel® Processor Trace for Effective Exploit Detection," arxiv.org, Jan. 2018, 7 pages.

Chevalier et al. "Co-processor-based Behavior Monitoring: Application to the Detection of Attacks Against the System Management Mode," arxiv.org, Mar. 2018, 13 pages.

Clercq et al. "SOFIA: Software and Control Flow Integrity Architecture," 2016 Design, Automation & Test in Europe Conference & Exhibition, 2016, pp. 1172-1177.

De Clercq Ruan et al. "A survey of Hardware-based Control Flow Integrity (CFI)," arxiv.org, Jul. 2017, 27 pages [retrieved online from: arxiv.org/ftp/arxiv/papers/1706/1706.07257.pdf].

Gu et al. "PT-CFI: Transparent Backward-Edge Control Flow Violation Detection Using Intel Processor Trace," CODASPY'17, Mar. 2017, pp. 173-184.

Lee et al. "The New Real-time Debug Interface for Efficient Code Reuse Attack Detection," IEEE, ISOCC 2015, 2015, pp. 93-94.

Lee Yongje et al. "Using CoreSight PTM to Integrate CRA Monitoring Ips in an ARM-Based SoC," ACM Transactions on Design Automation of Electronic Systems, Apr. 2017, vol. 22, No. 3, Article 52, 25 pages.

Liu et al. "Transparent and Efficient CFI Enforcement with Intel Processor Trace," 2017 IEEE International Symposium on High Performance Computer Architecture, 2017, pp. 529-540.

Moon et al. "Architectural Supports to Protect OS Kernels from Code-Injection Attacks," HASP 2016, Jun. 2016, 8 pages.

Niu et al. "Modular Control-Flow Integrity," PLDI'14, Jun. 2014, pp. 577-587.

Yuan et al. "Hardware-Assisted Fine-Grained Code-Reuse Attack Detection," RAID 2015, Nov. 2015, LNCS 9404, pp. 66-85.

Zhang et al. "Practical Control Flow Integrity & Randomization for Binary Executables," 2013 IEEE Symposium on Security and Privacy, 2013, pp. 559-573.

Extended Search Report for European Patent Application No. 20214995.1, dated May 17, 2021, 12 pages.

* cited by examiner

PROCESSOR ARRANGEMENT FOR MONITORING CONTROL-FLOW INTEGRITY

CROSS REFERENCE TO RELATED APPLICATIONS

This application claims the benefit of European Patent Application No. 20214995.1 filed Dec. 17, 2020, the contents of which are incorporated herein by reference in its entirety.

Cyberattacks are a growing threat on information and communications technology (ICT) systems, which are increasingly connected and exposed to the Internet. An arms race has developed between attack methods and counter measures.

A common attack type on computer systems is a control-flow attack. A control-flow attack exploits a program bug at application runtime to subvert the intended control-flow of a program to execute malicious program actions. Control-flow attacks, also referred to as runtime attacks, can be subdivided into two types: code-injection attacks and code-reuse attacks.

In a code-injection attack, malicious code is introduced into a call stack of a processor through the program bug. Program bugs commonly exploited for code-injection attacks are memory-corruption bugs of memory-unsafe languages, such as C/C++. Using the memory-corruption bug, an attacker injects the malicious code into an active stack frame of the call stack and overwrites a return address of the active stack frame such that the return address points to the address of the injected malicious code. An execution of a return instruction then leads to the execution of the malicious code.

In a code-reuse attack the attacker no longer inserts malicious code into the computer system but rather uses chunks of code that are already available in the computer system, for example, code contained in common shared libraries. In the broadest version of the code-reuse attack, also termed return-oriented programming, the attacker first places a payload into a memory space of the program. The payload comprises a number of instruction addresses pointing to instructions included in the code available on the computer system in an order, in which the attacker wants to use the instructions during the attack. Afterwards, the attacker uses the program bug to execute an instruction that sets the return address of the active stack frame to that of a first instruction address in the payload and subsequently executes a return instruction. When the return instruction is executed by the computer system, the first instruction address in the payload is loaded into an instruction pointer of the computer system and the remaining instructions pointed to by the payload are executed one-by-one.

While policy-based counter measures have been developed to prevent execution of injected code, such counter measures do not work against code-reuse attacks, because code-reuse attacks exploit existing code. To counter code-reuse attacks, techniques for control-flow integrity (CFI) checking have been developed, which detect runtime attacks by monitoring a program's branching behavior. CFI can detect a wide range of attacks as most attacks will eventually cause abnormal program behavior, such as an unexpected control-flow change or the execution of tampered instructions. CFI techniques can be subdivided into two approaches: software-based CFI and hardware-based CFI.

Software-based CFI techniques rely on code instrumentation, as part of a compiler transformation, static binary rewriting, or dynamic library translation. Hardware-based CFI techniques use a separate hardware component to monitor the program's branching behavior.

An example of a hardware-based CFI technique is disclosed in MOON H. et al. Architectural Supports to Protect OS Kernels form Code-Injection Attacks; HASP 2016: Proceedings of the Hardware and Architectural Support for Security and Privacy, June 2016, Article No. 5, 1-8, hereinafter referred to as Moon et al. Moon et al. disclose a hardware reference monitor, which can detect adversaries who inject their code and hijack the kernel control-flow to execute the injected code in the privileged mode. To that end, the hardware reference monitor examines target addresses of indirect branch instructions to detect the first control-flow transfer to a malicious code block, while the CPU runs in the kernel mode. The hardware reference monitor is placed outside the CPU and acquires the target addresses from a program-trace interface of the CPU.

It would be desirable to provide an improved protection against control-flow attacks.

The objective is achieved by providing a processor arrangement according to claim 1.

The processor arrangement comprises a processor under observation (PUO). The PUO has a processing unit, which is configured to execute an application program code stored in a memory and to provide application output data via an output interface and, in executing the application program code, to execute or not execute instructions in accordance with an execution pattern depending on the executed application program code.

Moreover, the PUO has an observation unit that is connected to the processing unit and configured to monitor execution of the application program code by the processing unit and to provide execution information indicative of the execution pattern associated with the execution of the application program code by the PUO.

Furthermore, the processor arrangement comprises a cybersecurity-monitoring engine, which is inaccessible by the PUO. The cybersecurity-monitoring engine comprises:
  an observation input interface for receiving the execution information;
  a memory unit storing pre-generated execution pattern information indicative of an expected execution pattern associated with an uncompromised version of the application program code executed by the PUO; and
  an execution-monitoring unit, which is configured to perform a comparison between the received execution information and the pre-generated execution pattern information and to detect, using a predetermined execution-anomaly criterion defining at least one undesired deviation of the retrieved execution information from the pre-generated execution pattern information, an execution anomaly in the retrieved execution information, and to provide a monitoring output signal indicative of the detected execution anomaly.

Additionally, the processor arrangement comprises a controllable latency-output-buffer unit, which is inaccessible by the PUO and comprises a buffer memory and which receives at least a part of the output data of the PUO and the monitoring output signal of the cybersecurity-monitoring engine. The controllable latency-output-buffer unit is configured to:
  temporarily store the received output data in the buffer memory for a pre-determined latency time span,
  output the temporarily stored output data from the buffer memory at the end of the latency-time span, if no monitoring output signal indicative of the detected execution anomaly has been received during the latency time span, and to block at least a part of the output from the buffer memory as soon as the monitoring output signal indicative of the detected execution anomaly has been received.

The present invention recognizes that software-based CFI techniques are neither effective nor secure. This is due to the limited compute power and the manipulation potential of the software itself. Based on this recognition, the invention uses a hardware-based CFI approach.

One element of proposed hardware-based CFI approach is formed by the observation unit, which is configured to monitor the execution of application program code of the processor unit and to provide execution information indicative of the execution pattern associated with the execution of the application program code by the PUO.

The execution information is indicative of the current execution pattern. The execution pattern corresponds to an order in which individual instructions or blocks of code of the application program code are executed. The order is determined by direct and indirect branch instructions comprised in the executed application program code.

Another element of the proposed hardware-based CFI approach is formed by the cybersecurity-monitoring engine, which continuously receives execution information from the PUO. Moreover, the cybersecurity-monitoring engine is configured to use the pre-generated execution pattern information to identify any anomalies in the execution pattern comprised by the execution information received from the PUO.

Furthermore, the invention recognizes that the detection of a control-flow attack alone is not sufficient to protect a computer system. For this reason, the invention comprises a controllable latency-output-buffer unit. The latency-output-buffer unit is configured to temporarily store at least a part of the output of the PUO until the cybersecurity-monitoring engine has established that the execution pattern does not comprise any anomalies that indicate execution of a malicious code. By temporarily storing at least a part of the output of the PUO, a maliciously changed control flow of the executed application program code is hindered from controlling or accessing any peripheral hardware connected to the PUO.

Moreover, the invention is based on the further recognition that examination of the execution pattern is only effective and secure if the cybersecurity-monitoring engine and the latency-output-buffer unit are physically separated from the PUO. For this reason, the cybersecurity-monitoring engine and the latency-output-buffer unit are realized as being inaccessible from the PUO. In this context, inaccessible means that an application program executed by the processing unit of the PUO does neither have access to any memory comprised in the cybersecurity-monitoring engine or the latency-output-buffer unit nor is able to influence any processing performed by the cybersecurity-monitoring engine or by the latency-output-buffer unit other than enqueuing output to the latency-output-buffer unit for its potential release after the cybersecurity-monitoring latency.

In the following, preferred embodiments of the trace-data-processing device will be described.

In a preferred embodiment of the processor arrangement, the latency time span is a fixed value. Using the fixed value for the latency time span is advantageous, because the processor arrangement does not require any synchronization between the execution-monitoring unit of the cybersecurity-monitoring engine and the latency-output-buffer unit. It also guarantees that the relative timing between output events generated by the PUO is maintained. A suitable fixed value can be determined using routine experimentation.

In another preferred embodiment of the processor arrangement, the execution-monitoring unit is additionally configured to output a buffer-synchronization signal upon completing the comparison to indicate the end of the latency-time span. Moreover, the latency-output-buffer unit receives the buffer-synchronization signal and is configured to output the temporarily stored output data from the buffer memory upon receiving the buffer-synchronization signal if no monitoring output signal indicative of the detected execution anomaly has been received before receiving the buffer-synchronization signal. This embodiment is particularly advantageous, because temporarily stored output data is output as soon as the execution-monitoring unit completed the comparison between the retrieved execution information and the pre-generated execution pattern information and no monitoring output signal indicative of a detected execution anomaly has been received.

In yet another preferred embodiment of the processor arrangement, the observation unit of the processor under observation is a trace unit, which is configured to generate and provide, via a trace interface, a trace-data stream, which comprises the execution information. In this embodiment, the observation input interface of the cybersecurity-monitoring engine is preferably a trace communication input interface for receiving the trace-data stream. Additionally, the cybersecurity-monitoring engine comprises a trace-data-processing unit, which is configured to retrieve the execution information from the received trace-data stream. Using a trace-data interface for transmitting the execution information from the PUO to the cybersecurity-monitoring unit has several advantages. Particularly in the case where the PUO and the cybersecurity-monitoring engine are not part of the same computer chip, the trace-interface provides a tamper-resistant communication channel. In addition, all common modern processor architectures produce trace data (e.g. ARM CoreSight, IntelPT), making the trace-data interface universally applicable. Moreover, it is non-intrusive and can even be applied to legacy software without requiring access to its source code because the trace data generation is solely system-controlled and no cooperation or instrumentation is required on the side of the application program code. Furthermore, trace units of commonly used processors allow using additional parameter settings to restrict the trace only to certain processes or certain processor cores so that only execution information relevant for the safekeeping of the computer system is being monitored.

In a variant of this embodiment, the trace-data stream comprises the execution information in the form of compressed trace data. Furthermore, the trace-data processing unit comprises a control-flow-reconstruction unit that is configured to decompress the trace data. This embodiment is particularly advantageous in those cases where only a limited bandwidth is available to the trace unit of the PUO for the output of trace data. In case of such a limited bandwidth, the standard approach implemented in most modern processors and System-on-Chips (SoCs) is to compress the trace-data stream. In the process of compression, the trace unit usually removes all information from the trace-data stream that can be inferred solely from the application program code. For retrieving the execution information from the trace-data stream, the trace-data-processing unit has to first decompress the trace-data stream based on the application program code. Such a decompression can be performed and is already known and disclosed in EP 2873983 B1.

In another preferred embodiment of the processor arrangement, the execution information is indicative of a jump-in instruction address of at least one given executed branch instruction. Moreover, the pre-generated execution pattern information is indicative of at least one permitted jump-in instruction address. In addition, the predetermined execution-anomaly criterion defines an executed branch instruction of the retrieved execution information whose jump-in instruction address is not among the at least one permitted jump-in instruction addresses the undesired deviation. Screening the jump-in instruction addresses of executed branch instructions, particularly of indirect branch instructions, is an efficient way to identify the execution of malicious code.

In a variant of this embodiment, the indication for the permitted jump-in instruction addresses is given in form of a whitelist. In another variant, the indication is given in form of a blacklist.

In yet another preferred embodiment of the processor arrangement, the execution information indicates an association of an observed jump-out instruction address to an observed jump-in instruction address for at least one branch instruction executed by the PUO during execution of the application program code. Furthermore, the pre-generated execution pattern information stored in the memory unit comprises at least one association of an expected jump-out instruction address to an expected jump-in instruction address. Moreover, the execution-anomaly criterion defines an executed branch instruction to be the undesired deviation if the association of the observed jump-out instruction address to the observed jump-in instruction address of the execution information is not comprised within the pre-generated execution pattern information. This embodiment is particularly preferred in those circumstances, in which for at least a part of the branch instructions comprised within the application program code the jump-in instruction addresses and the jump-out instruction addresses are known. These known jump-in instruction addresses and the jump-out instruction addresses are comprised in the pre-generated execution pattern information and are used as a whitelist for that part of the branch instructions. Furthermore, the use of jump-in and jump-out instruction addresses for the screening process allows to specify different allowed jump-in instructions for each jump-out instruction.

In a preferred variant of the described embodiment, the association of the expected jump-out instruction address to the expected jump-in instruction address in the pre-generated execution pattern information further is associated with a key attribute computed using a hash function with the expected jump-out instruction address and the expected jump-in instruction address as input parameters for the hash function. Moreover, the execution-monitoring unit is configured to compute a key value using the hash function with the observed jump-out instruction address and the observed jump-in instruction address as input parameters for the hash function. Furthermore, the execution-anomaly criterion defines an executed branch instruction as the undesired deviation if a key value does not match at least one key attribute in the pre-generated execution pattern information. This variant of the described embodiment is particularly advantageous because hash functions allow the creation of a data structure which allows an efficient determination of whether or not a key is contained within the data structure. This data structure allows for an increase in processing speed when the cybersecurity-monitoring engine computes whether branch instructions with a given jump-out instruction address and a given jump-in instruction address provided in the execution information are comprised within the pre-generated execution pattern information.

In yet another preferred embodiment of the processor arrangement, the execution information comprises a synchronization information element that is indicative of an instruction address associated with an instruction executed by the PUO during the execution of the application program code. Moreover, the pre-generated execution pattern information is indicative of at least one permitted instruction address range. Furthermore, the predetermined execution-anomaly criterion defines as the undesired deviation, that the instruction address of the executed instruction is outside the at least one permitted instruction address range. This embodiment is particularly advantageous because it allows the cybersecurity-monitoring engine to monitor the execution behavior of the application program based on individual instruction addresses, which are not necessarily branch instructions, which are periodically transmitted by the trace unit of the PUO.

In another preferred embodiment of the processor arrangement, the execution information is indicative of a jump-in instruction address or a jump-out instruction address of at least one given executed branch instruction. Furthermore, the pre-generated execution pattern information comprises at least one range of jump-out instruction addresses or at least one range of jump-in instruction addresses. Moreover, the predetermined execution-anomaly criterion defines an executed branch instruction of the retrieved execution information whose jump-out instruction address does not fall within the at least one range of jump-out instruction addresses or whose jump-in instruction address does not fall within the at least one range of jump-in instruction addresses as the undesired deviation. This embodiment is particularly advantageous in those cases, in which for at least a part of the branch instructions comprised in the uncompromised version of the application program code a range of instruction addresses for the jump-out instruction address or the jump-in instruction address is known. This range is then used to identify unexpected control-flow changes within the execution information provided by the PUO.

In yet another preferred embodiment of the processor arrangement, the execution information is indicative of an order, in which instructions of the application program code were executed by the PUO. Furthermore, the pre-generated execution pattern information is indicative of an expected order, in which instructions are expected to be executed by the PUO. In addition, the predetermined execution-anomaly criterion defines as the undesired deviation a deviation of the order indicated by the execution information from the expected order. This embodiment is particularly advantageous in those cases, in which at least for a part of the uncompromised version of the application program code the order, in which instructions are executed, is known. This order is then used to identify unexpected control-flow changes within the execution information provided by the PUO.

In yet another preferred embodiment of the processor arrangement the execution information is indicative of a number of consecutive executions of at least one branch instruction by the PUO. Additionally, the pre-generated execution pattern information comprises an upper limit of the number of consecutive executions of a given branch instruction by the PUO. Furthermore, the execution-monitoring unit is configured to determine from the retrieved execution information a current count of the consecutive executions of the given branch instruction, and to compare the current count with the upper limit. Moreover, the predetermined execution-anomaly criterion defines as the undesired deviation an exceeding of the upper limit by the number of consecutive executions of the given branch instruction. A consecutive execution of a given branch instruction is commonly also referred to as a loop. This embodiment of the processor arrangement is particularly advantageous in those cases, in which the application program code comprises at least one loop and for this one loop an upper limit for the number of consecutive executions is known for the uncompromised version of the application program code. This upper limit is then used in the described embodiment to identify an unexpected control-flow change in the execution information provided by the PUO.

In yet another embodiment of the processor arrangement, the pre-generated execution pattern information comprises an upper limit of the number of consecutively executed branch instructions by the PUO. Furthermore, the execution-monitoring unit is configured to determine from the retrieved execution information a current count of consecutively executed branch instructions, and to compare the current count with the upper limit. Additionally, the predetermined execution-anomaly criterion defines as the undesired deviation an exceeding of the upper limit by the number of consecutively executed branch instructions. This embodiment is particularly advantageous to identify an unexpected control-flow change in the execution information provided by the PUO in those cases where the upper limit could be identified by executing uncompromised versions of the code.

In a variant of the embodiment described above, the upper limit is indicative of a number of consecutively executed direct branch instructions. In yet another variant, the upper limit is indicative of the number of consecutively executed indirect branch instructions. Both variants provide another criterion for identifying an execution of malicious code by the PUO.

In yet another preferred embodiment of the processor arrangement, the execution information is indicative of a number of repetitive executions of at least one branch instruction by the PUO. Furthermore, the pre-generated execution pattern information comprises an upper limit of the number of repetitive executions of a given branch instruction by the PUO and a counter-reset instruction address for the given branch instruction. Additionally, the counter-reset instruction address is associated with a predetermined further branch instruction that is reached by the PUO after reaching the given branch instruction. Moreover, the execution-monitoring unit is configured to determine from the retrieved execution information a current count of the repetitive executions of the given branch instruction, to compare the current count with the upper limit, and to reset the current count immediately after the counter-reset instruction has been reached by the PUO. In addition, the predetermined execution-anomaly criterion defines as the undesired deviation an exceeding of the upper limit by the current count of repetitive executions of the given branch instruction. Often, branch instructions are arranged within a program code in such an order that so-called nested loops are created. This embodiment of the processor arrangement is particularly advantageous in those cases, in which the uncompromised version of the application program code comprises at least one nested loop version and an upper limit for the number of executions is known. This upper limit is then used in the described embodiment to identify an unexpected control-flow change in the execution information provided by the PUO.

In another preferred embodiment of the processor arrangement, the trace-data-processing unit is configured to identify, using the retrieved execution information, a respective jump-out instruction address of those branches associated with executing a call instruction and a respective jump-in instruction address of those branches associated with executing a return instruction. Moreover, the execution-monitoring unit additionally comprises a call-stack memory unit and is configured to
   store return-instruction-address information indicative of that instruction address immediately following, in an order of execution of the application program code, the identified jump-out instruction address in the call-stack memory unit, and
   perform a comparison between the identified jump-in instruction address and the instruction address indicated by the return-instruction-address information.

Additionally, the predetermined execution-anomaly criterion defines a deviation of the identified jump-in instruction address from the instruction address indicated by the return-instruction-address information as a further execution anomaly. Moreover, the execution-monitoring unit is configured to provide, upon detecting the further execution anomaly, the monitoring output signal indicative of the detected further execution anomaly.

This embodiment of the processor arrangement allows the identification of unexpected changes in the control flow of the application program code without any further information on the uncompromised version of the application program code. Therefore, this embodiment is particularly advantageous for those cases, in which no information or only limited information is available on the control flow of the uncompromised version of the application program flow. It shall be understood that the described embodiment also comprises those embodiments of the processor arrangement that do not store the instruction address immediately following the identified jump-out instruction address itself, but information, such as the identified jump-out instruction address, from which the instruction address immediately following the identified jump-out instruction address can be derived in a predetermined manner.

In another preferred embodiment of the processor arrangement, the PUO and the cybersecurity-monitoring engine are integrated within the same computer chip. An integration of the cybersecurity-monitor engine together with the PUO on the same computer chip is particularly advantageous for reducing a physical size of the processor arrangement.

The security of updates can be achieved even via protocol-technically unsecured interfaces, provided that interface access can be physically controlled. However, in an advantageous further preferred embodiment of the processor arrangement, the processor arrangement additionally includes a secure-update unit. The secure-update unit comprises
   an interface to receive an update file comprising updated pre-generated execution pattern information generated by a trusted update provider, and
   an update information memory storing update validation information.
Additionally, the secure-update unit is configured to
   verify that the received update file stems from the trusted update provider using the update validation information, and only replace the pre-generated execution pattern information with the updated pre-generated execution pattern information, if the verification indicates that the update file stems from the trusted source.

This embodiment is particularly advantageous in those cases where the pre-generated execution pattern information requires an update. The described embodiment allows a secure update of this information by verifying that the update file stems from the trusted source. It shall be understood that the embodiment described above also comprises those embodiments in which other information required to operate the cybersecurity-monitoring engine, such as the predetermined execution-anomaly criterion, or the latency-output-buffer unit are securely updated in the same manner as described above.

In the following, further embodiments will be described with reference to the enclosed drawings. In the drawings:

FIG. 1c shows another alternative embodiment of a processor under observation of the processor arrangement of FIG. 1a;

FIG. 7A shows a representation of an uncompromised version of an exemplary application program code executed by a processor under observation shown in FIG. 1a;

FIG. 7B shows parts of the pre-generated execution pattern information generated from the application program code shown in FIG. 7A;

Figure 1A:
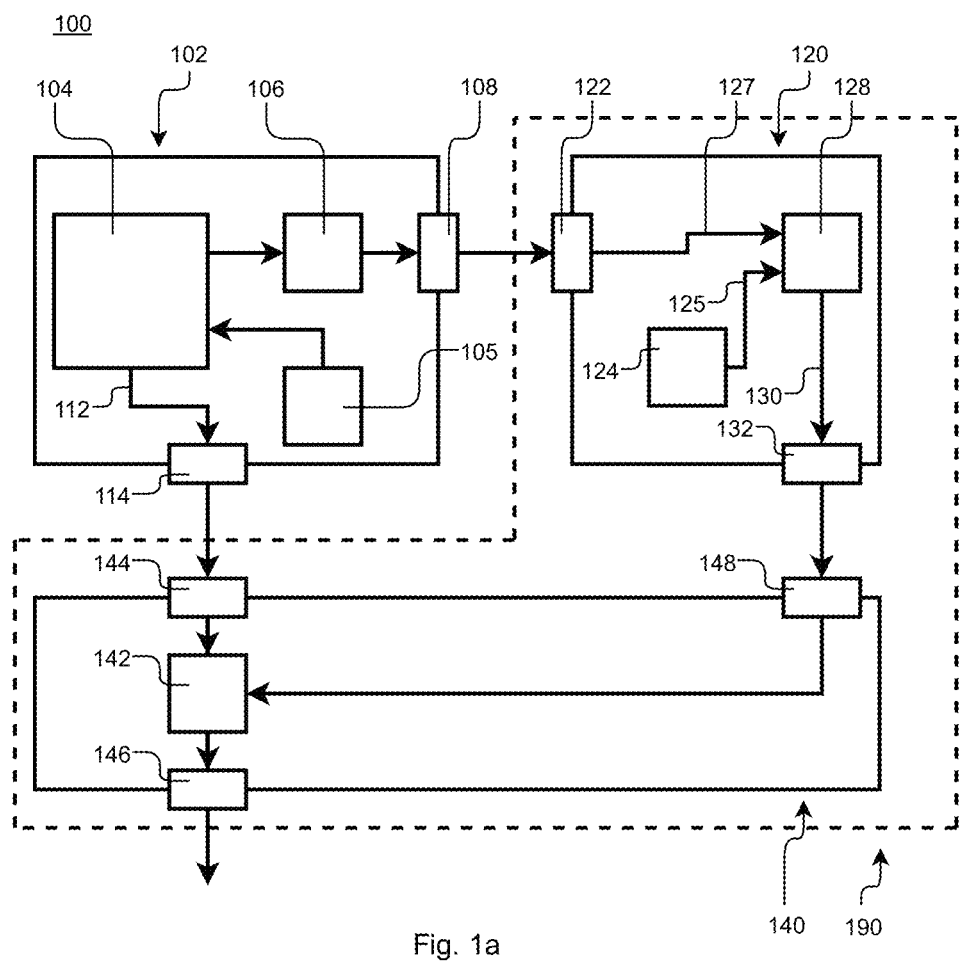
FIG. 1a shows a processor arrangement according an embodiment of the invention.

FIG. 1a shows a processor arrangement 100 according to an embodiment of the invention. The processor arrangement comprises a processor under observation 102, hereinafter referred to as PUO. For protecting the PUO 102 from becoming compromised by an execution of malicious code, including a disclosure of secret internal information to unauthorized entities, and for protecting any device connected to the PUO from a compromised PUO, the processor arrangement 100 additionally comprises a cybersecurity-monitoring engine 120 and a controllable latency-output-buffer unit 140.

The PUO 102 comprises a processing unit 104, which is configured to execute an application program code stored in a memory 105. The processing unit 104 is configured to provide application output data 112, which is generated as a result of the execution of the application program code, via an output interface 114.

In executing the application program code, processing unit 104 is configured to execute or not execute instructions, in accordance with an execution pattern of the executed application program code. The execution pattern corresponds to an order in which individual instructions or blocks of code of the application program code are to be executed. The order is determined by a direction of execution of the application program code, and by direct and indirect branch instructions comprised in the application program code to be executed.

For observing the execution of instructions by the processing unit 104, the PUO 102 also comprises an observation unit 106, wherein the observation unit 106 is connected to the processing unit 104 and configured to monitor the execution of the application program code by the processing unit 104 and to provide, via an observation-output interface 108, execution information 127 indicative of the execution pattern associated with the execution of the application program code by the PUO 102. Moreover, the observation unit 106 is configured to monitor the execution of the application program code such that it can be neither detected by the application program code nor influenced by it, rendering it temper-resistant to the application program code.

The cybersecurity-monitoring engine 120 receives the execution information 127 via an observation-input interface 122 and is configured to monitor the processing performed by the PUO 102 based on the received execution information 127. To this end, the cybersecurity-monitoring engine 120 further comprises a memory unit 124 and an execution-monitoring unit 128.

The pre-generated execution-pattern information 125 provided by the memory unit 124 and the execution information 127 provided by the observation-input interface 122 are received by the execution-monitoring unit 128. The execution-monitoring unit 128 is configured to perform a comparison between the retrieved execution information 127 and the pre-generated execution-pattern information 125, and to detect, using a predetermined execution-anomaly criterion defining at least one undesired deviation of the retrieved execution information 127 from the pre-generated execution-pattern information 125, an execution anomaly in the retrieved execution information 127. Moreover, the execution-monitoring unit 128 is configured to provide a monitoring-output signal 130 indicative of the detected execution anomaly. In an alternative embodiment of the execution-monitoring unit 128, the pre-generated execution-pattern information is hardwired into the execution-monitoring unit 128. As a result, the memory unit 124 is not required in this alternative embodiment.

As part of the cybersecurity-protection unit 190, the processor arrangement comprises a controllable latency-output-buffer unit 140, which is configured to temporarily store the output data 114 of the PUO 102 until the cybersecurity-monitoring engine 120 has performed its review of respective parts of the execution information 127. To this end, the controllable latency-output-buffer unit 140 comprises a data-input interface 144, through which it receives the output data 114 of the PUO, a monitor-input interface 148 through which the monitoring-output signal 130 is received, and a buffer memory 142. The latency-output-buffer unit 140 is configured to temporarily store the received output data 114 in the buffer memory 142 for a pre-determined latency time span. In the embodiment of the processor arrangement 100 shown in FIG. 1a, the latency time span is a fixed value and corresponds to an upper limit of a processing time that the cybersecurity-monitoring engine 120 requires for processing respective parts of the execution information 127.

Furthermore, the latency-output-buffer unit 140 is configured to output the temporarily stored output data from the buffer memory 142 via a data-output interface 146 at the end of the latency-time span if no monitoring output signal 130 indicative of a detected execution anomaly has been received during the latency time span. Moreover, the latency-output-buffer unit 140 is configured to block at least a part of the output from the buffer memory 142 as soon as the monitoring output signal 130 indicative of a detected execution anomaly has been received.

In the processing arrangement shown in FIG. 1a, the latency-output-buffer unit 140 receives all the output generated by the PUO 102. However, in alternative embodiments of the processor arrangement, the latency-output-buffer unit only receives a fraction relevant for the security of the output data of the PUO. This is advantageous to reduce the required amount of memory for temporarily storing the output of the PUO 102.

Both, the cybersecurity-monitoring engine 120 and the latency-output-buffer unit 140 are part of a cybersecurity-protection unit 190. In the embodiment of the processor arrangement 100 of FIG. 1a, the PUO and the cybersecurity-protection unit are integrated into a single chip. In one such embodiment, this chip is a system on chip (SoC) that includes an FPGA, wherein the cybersecurity-protection unit 190 is implemented in an FPGA part of the chip. In another such embodiment, the processor arrangement is implemented as an application-specific standard product (ASSP). In other embodiments of the processor arrangement, the cybersecurity-protection unit 190 is a plug-in device, which is added to an information and communications technology (ICT) system and removably connected to the PUO 102 to form the processor arrangement 100 shown in FIG. 1a.

In all embodiments and variants of the processor arrangement, the cybersecurity-protection unit 190 is inaccessible by the PUO. The PUO can influence neither the processing of the trace-data stream performed by the cybersecurity-monitoring engine nor the temporary storing of the output of the PUO by the controllable latency-output-buffer unit. In some of the embodiments, this form of separation is implemented by limiting the interfaces between the PUO and the cybersecurity-protection unit to the interfaces shown in FIG. 1a. In other embodiments, the separation is implemented by requiring authorization through use of, e.g., a password for the PUO to access the cybersecurity-protection unit.

In the following, two alternative embodiments of the PUO 102 will be described in reference to FIG. 1b and FIG. 1c to highlight the features of the observation unit 106 in different variants.

Figure 1B:
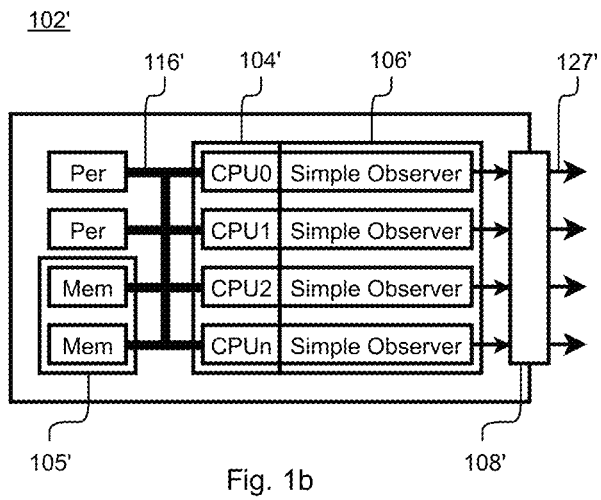
FIG. 1b shows an embodiment of a processor under observation of the processor arrangement of FIG. 1a comprising simple observer units.

FIG. 1b shows an embodiment of a processor under observation, PUO, 102' of the processor arrangement of FIG. 1a, comprising simple observer units.

The embodiment of the PUO 102' of FIG. 1b is a multi-core system-on-a-chip (SoC) comprising a processing unit 104' with a plurality of central processing units, hereinafter CPUs, four of which are shown for simplicity and labeled CPU0, CPU1, CPU2, CPUn, indicating that fewer or more than four CPUs may be present in different types of PUOs. The CPUs are connected with a memory unit 105' comprising two memory sub-units labelled as "Mem" for storing the application program code. Moreover, the PUO 102' comprises peripheral devices, which are schematically summarized by the peripheral device blocks labeled "Per", which also comprise any output interface for forwarding a result of the execution of the application program code. Data communication between the memory sub-units, the peripheral devices, and the CPUs is facilitated by a communication bus 116'.

Additionally, the PUO 102' comprises an observation unit 106', which comprises four simple-observer units, labelled "Simple Observer" in FIG. 1b. The simple-observer units are each attached to one of the four CPUs and are configured to monitor the execution of the application program code by the CPUs and to generate and provide execution information 127' indicative of the execution pattern associated with the execution of the application program code by each of the CPUs via an observation-output interface 108'. In some embodiments of the simple-observer unit, the simple-observer unit is configured to monitor execution of the application program code by monitoring a retirement pipeline of the processing unit 104'.

This embodiment 102' of the PUO is particularly advantageous, if PUO and cybersecurity-monitoring engine are arranged within the same chip, which provides for a large bandwidth for communication between the observation unit 106' and the cybersecurity-monitoring engine.

The observation unit 106' is configured to output execution information for each one of the CPUs in parallel. A compatible cybersecurity-monitoring engine therefore has to be configured to process all four streams of execution information. Alternatively, it is possible that the cybersecurity-monitoring engine comprises four independent execution-monitoring units.

In case, the PUO and the cybersecurity-monitoring engine are part of different chips, it is recommended to use a trace unit of the PUO as the observation unit for forwarding the execution information to the cybersecurity-monitoring engine, which will be described in the following with regard to FIG. 1c.

Figure 1C:
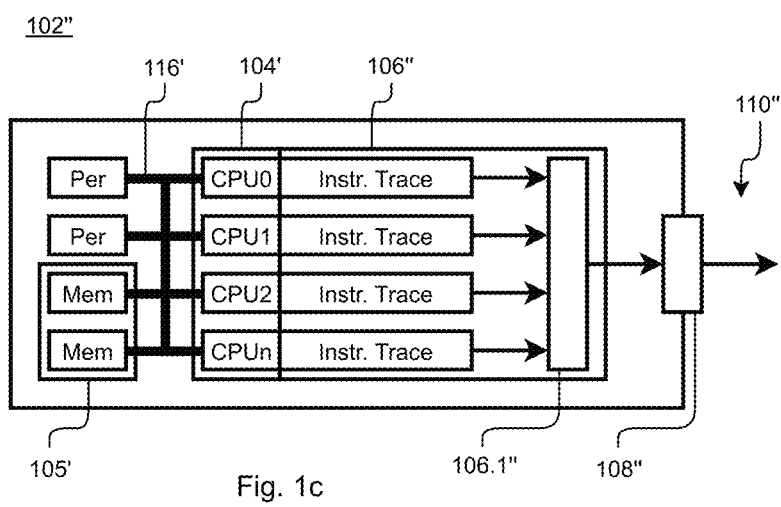

FIG. 1c shows another alternative embodiment of a processor under observation, PUO, 102" of the processor arrangement of FIG. 1a.

Many elements of the PUO 102" are identical to those of the PUO 102'. Those elements are labeled with the same reference number and, for reasons of brevity, are not described again.

The PUO 102" differs from the PUO 102' mainly in regard to the observation unit comprised within the PUO. The PUO 102" comprises an observation unit 106" which is a trace unit. The observation unit 106" comprises four CPU-attached hardware trace units labeled "Instr. Trace", which are each attached to one of the CPUs for monitoring its processing activities. Each of the CPU-attached hardware trace units is configured to monitor the processing activities of a respective CPU and generate a trace-data stream comprising respective execution information. The trace-data stream of each of the CPU-attached hardware trace units is received by a trace-buffer-and-concentrator unit 106.1", which is configured to form a single trace-data stream 110" that is output via a trace-output interface 108". In a simple implementation of the observation unit 106", the output of trace data is performed without compression. This requires a significant amount of bandwidth, but on the hand a comparatively low effort for control-flow reconstruction. Such a simple implementation is therefore particularly suited for a single-chip implementation. An alternative implementation that uses a high compression of the trace data significantly reduces bandwidth requirements, but requires a comparatively high effort for control flow reconstruction. This alternative solution is particularly well suited for an off-chip implementation.

To be able to retrieve and analyze the execution information from the trace-data stream 110", the cyber-security-monitoring engine 120 of the processor arrangement 100 needs to be specifically adjusted. Such an adjusted cybersecurity-monitoring engine will be described in the following with reference to the processor arrangement shown in FIG. 2.

This processor arrangement is also configured to use a latency time span that is not fixed in contrast to the one used by the processor arrangement of FIG. 1*a*.

Figure 2:
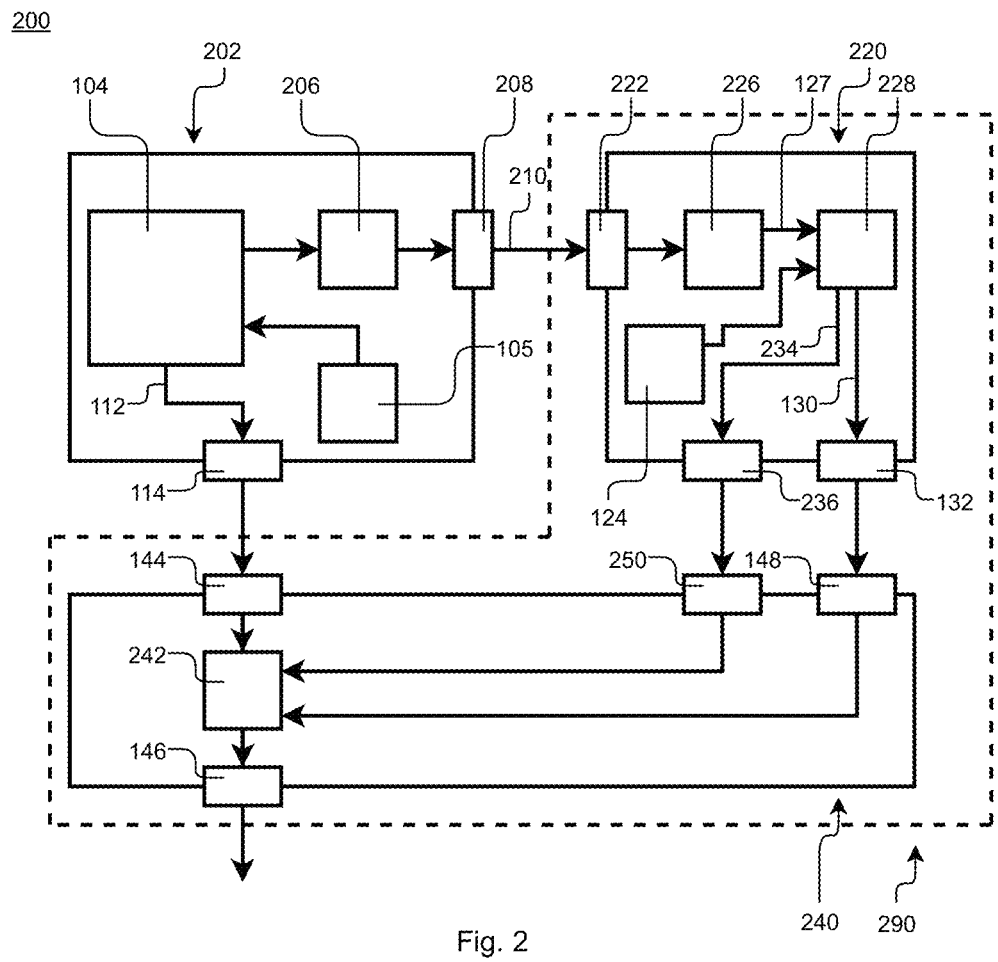
FIG. 2 shows a processor arrangement comprising a controllable latency-output-buffer unit using a variable latency time span.

FIG. 2 shows a processor arrangement 200 comprising a controllable latency-output-buffer unit 240 using a variable latency time span.

Features of the processor arrangement 200 that are identical to those of the processor arrangement 100 are labeled using identical reference signs. For an explanation of those features, the reader is referred to the description of FIG. 1*a*. In the following, only those features that are characteristic to the processor arrangement 200 will be explained in detail.

Identical to the processor arrangement 100, the processor arrangement 200 also comprises a processor under observation (PUO) 202 and a cybersecurity-protection unit 290, which includes a cybersecurity-monitoring engine 220 and a controllable latency-output-buffer unit 240.

The cybersecurity-monitoring engine 220 differs from that of the processor arrangement 100 in that the cybersecurity-monitoring engine 220 comprises an execution-monitoring unit 228, which is additionally configured to output a buffer-synchronization signal 234 upon completing the comparison, to indicate the end of the latency-time span.

The buffer-synchronization signal 234 is output through a synchronization-output interface 236.

To this end, the execution-monitoring unit 228 is configured to identify, using the execution information 127, which section of the uncompromised version of the application program code was executed by the PUO 102 and determine based on the identified section whether the PUO 202 generated any output data 112 that has to be released from the latency-output-buffer unit. This can be implemented in various different ways. In one example, a call to a "printf" function can cause an output.

The buffer-synchronization signal 234 is received by the latency-output-buffer 240 via a synchronization-input interface 250. Subsequently, the buffer-synchronization signal 234 is forwarded to a buffer memory 242. The buffer memory is configured to output the temporarily stored output data 112 from the buffer memory 242 upon receiving the buffer-synchronization signal 234, if no monitoring output signal indicative of the detected execution anomaly has been received before receiving the buffer-synchronization signal 234.

Beside the features related to the controllable latency-output-buffer unit 240 using a variable latency time span, the processor arrangement 200 of FIG. 2 also differs in the way execution information is transmitted from the PUO 202 to the cybersecurity-monitoring engine 220. In the embodiment of FIG. 2, the execution information is collected by an observation unit 206, which is a trace unit of the PUO 202, wherein the trace unit 206 is configured to generate and provide, via a trace interface 208, a trace-data stream 210, which comprises the execution information. In comparison to the observation unit 106, which is configured to provide the execution information in an unspecified form, the trace unit 206 is specifically configured to provide the execution information in a trace-data stream 210 is highly compressed to reduce requirements on an output channel. This is particularly relevant in the case that the cybersecurity-monitoring engine 220 and the processor under observation 202 are not part of the same chip, as is the case for the example shown in FIG. 2.

The cybersecurity-monitoring engine 220 receives the trace-data stream 210 via a trace-input interface 222. Within the cybersecurity-monitoring engine 220, the trace-data stream 210 is forwarded to a trace-data-processing unit 226, which is configured to retrieve and provide the execution information 127 from the received trace-data stream 210 to the execution-monitoring unit 228.

In the processor arrangements of FIG. 2, the trace-data-processing unit of the cybersecurity-monitoring engine is configured to retrieve the execution information from the trace-data stream. However, the trace-data stream generated by modern processors requires a very high bandwidth for transmission, due to the processor's capability to perform a large number of operations during a single clock cycle, and due to a high frequency of the clock signal modern processors operate on. For this reason, trace units of modern processors commonly compress the trace-data stream before it is output. In the process of compression, the trace unit usually removes all information from the trace-data stream that can be determined solely from the application program code. To retrieve the execution information from the trace-data stream, the trace-data-processing unit has to first decompress the trace-data stream based on the application program code. An embodiment of the processor arrangement that is configured to decompress the trace-data stream is described in the following with regard to FIG. 3.

Figure 3:
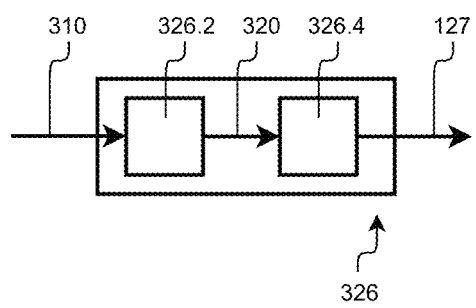
FIG. 3 shows a modified trace-data-processing unit of a processor arrangement, which is configured to decompress a compressed trace-data stream.

FIG. 3 shows a simplified block diagram of a trace-data-processing unit 326 of an alternative embodiment of a processor arrangement, which is configured to decompress a compressed trace-data stream 310.

The alternative embodiment of the processor arrangement is largely identical to the processor arrangement 200. The difference mainly lies in the trace unit of the PUO and the trace-data-processing unit 326. The trace unit of the PUO is configured to provide the compressed trace-data stream 310 at its output. The compressed trace-data 310 stream differs from the uncompressed trace-data stream 210 of FIG. 1*a* in that in the compressed trace-data stream 310 all information which can be externally determined from the application program code is omitted. As a consequence, execution information has to be reconstructed from the following messages comprised within the compressed trace-data stream 310:

instruction-synchronization messages, also referred to as instruction-synchronization elements, indicative of an instruction address of an instruction executed by the PUO, and branch messages indicative of execution or non-execution of a branch instruction and, in the case of execution of an indirect branch instruction, information about the jump-in instruction address of the executed indirect branch message.

To recover the execution information from the compressed trace-data stream, the trace-data-processing unit 326 comprises a control-flow-reconstruction unit 326.2.

The control-flow-reconstruction unit 326.2 receives the compressed trace-data stream 310 from the PUO 102 and is configured to decompress the compressed trace-data stream 310. In the embodiment shown in FIG. 3, the control-flow-reconstruction unit 326.2 is in accordance with solutions disclosed in EP 2 873 9831 A1. In one particular embodiment, the control-flow-reconstruction unit 326.2 is configured to decompress the trace-data stream according to a method described in paragraphs [0133]-[0140] of EP 2 873 9831 A1.

After performing the decompression of the trace-data stream 310, the control-flow-reconstruction unit 326.2 provides an uncompressed trace-data stream 320 to an execution-information-extraction unit 326.4. The execution-information-extraction unit 326.4 is configured to extract and provide the execution information 127 required by the execution-monitoring unit 228 from the decompressed trace-data stream 320.

In the following, alternative embodiments of the execution-monitoring unit 128 that monitor various aspects of the execution information 127 will be described with reference to FIGS. 4-10. A first alternative embodiment of the execution-monitoring unit 128, which is configured to monitor the execution of branch instructions by the PUO 102, will be described with reference to FIGS. 4-6.

Figure 4:
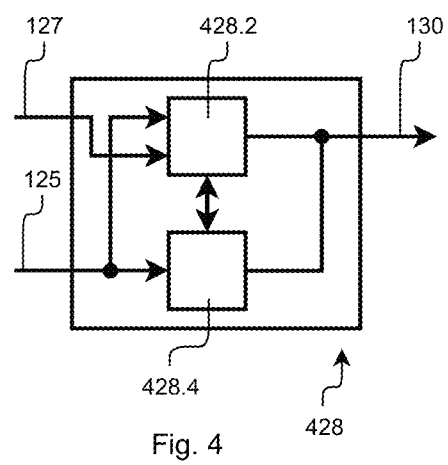
FIG. 4 shows a modified execution-monitoring unit, which is configured to monitor executions of branch instructions by the processor under observation based on a jump-in instruction address and a jump-out instruction address associated with the executed branch instruction.

FIG. 4 shows an execution-monitoring unit 428 that forms an alternative embodiment of the execution-monitoring unit 128 of FIG. 1a, which is configured to monitor executions of branch instructions by the PUO 102 based on a jump-in instruction address and a jump-out instruction address associated with an executed branch instruction.

The execution-monitoring unit 428 of FIG. 4 comprises an execution-monitoring processor 428.2 and a monitoring-evaluation processor 428.10. The execution-monitoring processor 428.2 receives the execution information 127 and the pre-generated execution-pattern information 125.

The execution-monitoring processor 428.2 is configured to perform, in a first step, a strict analysis of the jump-in instruction address and the jump-out instruction address of each branch instruction executed by the PUO 102. To this end, the execution-monitoring processor 428.2 is configured to identify for each executed branch instruction, the jump-in instruction address and the jump-out instruction address, also referred to in the following as observed jump-in instruction address and observed jump-out instruction address, from the execution information 127. In addition, the pre-generated execution pattern information 125 received from the memory unit 124 comprises at least one association of an expected jump-out instruction address to an expected jump-in instruction address. The execution-monitoring processor 428.2 is configured to compare the observed and the expected jump-out instruction address and jump-in instruction address. The execution-anomaly criterion defines an executed branch instruction to be the undesired deviation if the association of the observed jump-out instruction address to the observed jump-in instruction address of the execution information is not comprised within the pre-generated execution pattern information.

In principle, the representation of the association between the expected jump-in instruction address and the expected jump-out instruction can assume various forms. However, it is particularly advantageous, if the association between the expected jump-in instruction address and the expected jump-out instruction is given in a form suited to quickly retrieve information from a large amount of data. An example of such a suitable form is a hash table. An example of such a hash table, which is suited for use by the execution-monitoring processor 428.2 is given in FIG. 5A and will be described in the following in more detail.

In an alternative embodiment, the execution-monitoring processor 428.2 is configured to perform the strict analysis solely of the jump-in instruction address of the branch instructions executed by the PUO 102. In this embodiment, the execution-monitoring processor 428.2 is configured to identify for each executed branch instruction, the jump-in instruction address, also referred to in the following as observed jump-in instruction address from the execution information 127. In addition, the pre-generated execution pattern information 125 received from the memory unit 124 is indicative of at least one permitted jump-in instruction addresses. The execution-monitoring processor 428.2 is configured to compare the observed and the permitted jump-in instruction address. The execution-anomaly criterion defines an executed branch instruction to be the undesired deviation, if the observed jump-in instruction address is not one of the permitted jump-in instruction addresses indicated by the pre-generated execution pattern information.

Figure 5A:
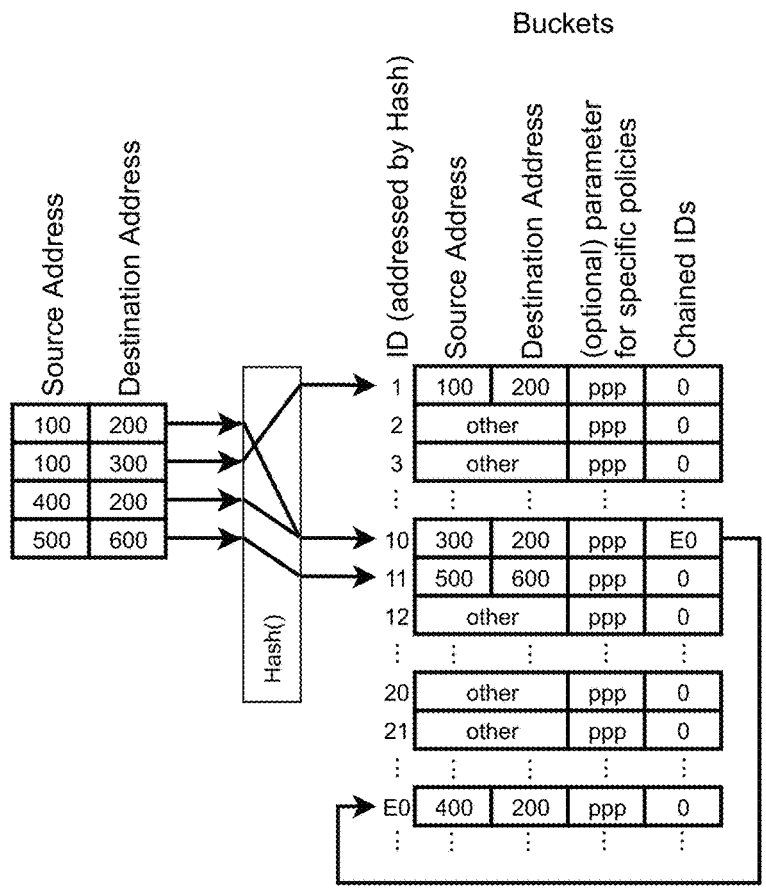
FIG. 5A shows an association between the expected jump-in instruction address and the expected jump-out instruction in form of a hash table, which is used by the execution-monitoring unit of FIG. 4.

FIG. 5A shows an association between the expected jump-in instruction address and the expected jump-out instruction in form of a hash table, which is used by the execution-monitoring unit 428 of FIG. 4.

A hash table comprises two elements: a hash function and a table, which is commonly referred to as "Buckets". The hash function, represented by a label "Hash( )" in FIG. 5A, is configured to map a value given as an argument to the function to an index of the table "Buckets". In the case of the execution-monitoring processor 428.2, jump-out instruction address and jump-in instruction address of a branch instruction executed by the PUO 102 serve as the argument to the hash function. This is shown in a left side of FIG. 5A by the arrows mapping each of four exemplary pairs of a jump-out instruction address, labeled as "source address", and a jump-in instruction address, labeled as "Destination Address", to a row of the table "Buckets".

The table "Buckets" has five columns. A column labeled "ID", a column labeled "Source Address", a column labeled "Destination Address", and a column labeled "Chained IDs" serve for navigating the entries in the table.

The column "Source Address" and the column "Destination Address" indicate the jump-out instruction address and the jump-in instruction address associated with the information provided in the respective row, respectively. In most cases, the values of those two columns will be identical to those provided as the argument to the hash function. However, in some case, two different arguments of the hash function are mapped to the same index. In the example shown in FIG. 5A, this is the case for the pair of jump-out instruction address and jump-in instruction address "100, 200" and the pair "400, 200", which are both mapped to the same index "10". If such a collision between two pairs is noted during a construction of the table "Buckets", the conflicting second pair is written into an additional row of the table and the index of that row is written into the column "Chained IDs" as is illustrated in table "Buckets" for the row with the index "10" and the row with the index "E0". Therefore, when retrieving information for a pair from the hash table, the execution-monitoring processor 426.2 is configured to always check whether the columns "Source Address" and "Destination Address" match the pair that served as the argument to the hash function. If the input arguments do not match, the execution-monitoring processor 426.2 is configured to search all rows associated to the current row through the column "Chained IDs", which is visualized by the arrow on the left side of FIG. 5A pointing from the row with index "10" to the row with index "E0". The described handling of conflicting entries in the hash table is to be understood only as an example. It is also possible to use other methods for generating the hash table, such as Cuckoo-Hashing, that render conflicts practically impossible. Moreover, it would also be possible to use Bloom filters to reduce the number of conflicts within the table.

The above described columns for navigating the table "Buckets" mainly serve for verifying that a branch instruction executed by the PUO 102 is indeed part of the uncompromised version of the application program code. If the pair of jump-in instruction address and jump-out instruction address cannot be found within the table, it is indicative for the PUO 102 executing malicious code. Furthermore, using the column labeled "(optional) parameter for specific policies", the table "Buckets" can also be used to verify the context in which a branch instruction is executed.

The entries in column "(optional) parameter for specific policies", hereinafter also referred to as column "Policy Parameter", contains an entry which points to a policy to be checked when the respective branch instruction is executed, wherein policies can apply to the executed branch instruction itself or instructions executed before or after the respective branch instruction was executed. A more detailed discussion of policies will follow with reference to FIGS. 6-7C. A flow chart of how hash table of FIG. 5A is used by the execution-monitoring processor 428.2 is given in FIG. 5B and will be discussed in the following.

Figure 5B:
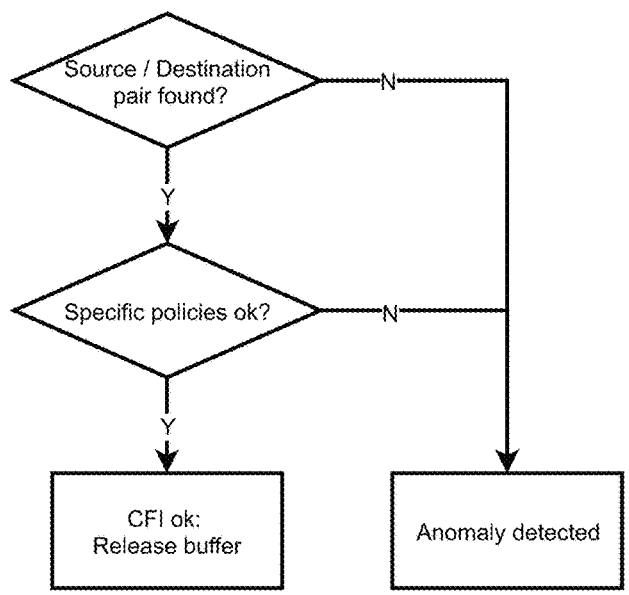
FIG. 5B shows a flow diagram illustration operation of the execution-monitoring processor of FIG. 4 using the hash table shown in FIG. 5A.

FIG. 5B shows a flow diagram of the operation of the execution-monitoring processor 428.2 of FIG. 4 using the hash table of FIG. 5A.

Upon receiving execution information indicative of the execution of a branch instruction with a respective pair of jump-out instruction address and jump-in instruction address by the PUO 102, the execution-monitoring processor 428.2 determines whether the respective pair of jump-out instruction address and jump-in instruction address is comprised within the hash table included in the pre-generated execution-pattern information, which is indicated by a step labeled "Source/Destination pair found?". If the respective pair of instruction addresses is comprised within the hash table, the execution-monitoring processor 428.2 checks if the associated policies, if any, are fulfilled, which is indicated by a step labeled "Specific policies ok?". If both conditions checked in both steps are fulfilled, the monitoring output signal 130 is not output and, as a result, the latency-output-buffer unit 140 releases the temporarily stored output from the buffer memory 142. If conditions associated to one of the two steps are not fulfilled, the monitoring output signal 130 is output, indicated by a step labeled "Anomaly detected". As a result, the release of temporarily stored output data from the PUO 102 by the latency-output-buffer unit 140 is blocked.

A prerequisite for the approach described with reference to FIG. 5A and FIG. 5B is that the jump-in instruction address and the jump-out instruction address for each branch instruction of the uncompromised version of the application program code is known. For direct branch instructions whose branch instructions are known at compile time, this can be achieved by analyzing the application program code itself. For indirect branch instructions whose branch instructions are only known at runtime, so called "golden" system runs have to be performed with the uncompromised application program, wherein the jump-in instruction addresses of indirect branch instructions are recorded for a plurality of executions under varying conditions. Such an extensive measurement is not always possible. For this reason, the execution-monitoring unit 428 shown in FIG. 4 comprises a execution-monitoring processor 428.4 implementing less rigid constraints, which will be described in the following.

The execution-monitoring processor 428.4 is configured to analyze the jump-in instruction address for every indirect branch instruction, which could not be verified by the execution-monitoring processor 428.4. To this end, the execution-monitoring processor 428.4 receives the jump-in instruction address of the unverified branch instruction from the execution-monitoring processor 428.2 and the pre-generated execution-pattern information 125. The execution-monitoring processor 428.4 is configured to compare the received jump-in instruction address with at least one range of jump-in instruction addresses comprised within the pre-generated execution pattern information 125, wherein the predetermined execution-anomaly criterion defines an executed branch instruction of the retrieved execution information whose jump-in instruction address does not fall within the at least one range of jump-in instruction addresses as the undesired deviation.

The execution-monitoring processor 428.4 only monitors those indirect branch instructions which could not be verified by the execution-monitoring processor 428.4. However, in other embodiments of the execution-monitoring unit 428, the execution-monitoring processor 428.4 monitors all indirect branch instruction executed by the PUO 102. In yet other embodiments of the execution-monitoring unit 428, the execution-monitoring processor 428.4 monitors all branch instructions executed by the PUO 102. Moreover, in some of the embodiments of the execution-monitoring processor 428.4, the execution-monitoring processor 428.4 additionally or alternatively verifies the jump-out instruction address of executed branch instructions.

Besides the instruction address associated to the jump-in instruction address or the jump-out instruction address associated to a branch instruction, the execution information also includes synchronization-information elements indicative of an instruction address associated to an instruction executed by the PUO 102, which is not a branch instruction. This information is also valuable to determine if the PUO 102 is executing malicious code. In the following, a further alternative embodiment of the execution-monitoring unit 128 will be described with reference to FIG. 6 that also analyses the synchronization information element.

Figure 6:
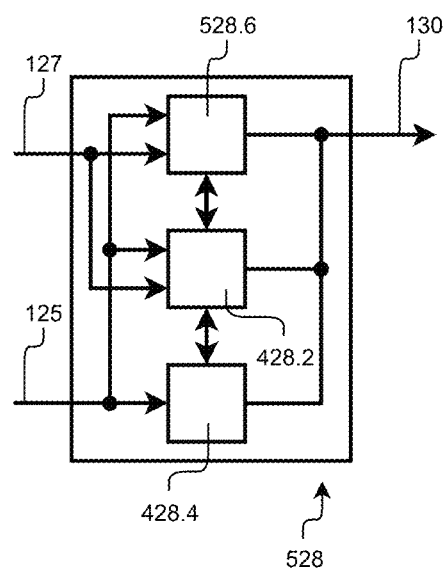
FIG. 6 shows a further modified execution-monitoring unit, which is configured to monitor executions of instructions by the PUO other than branch instructions.

FIG. 6 shows a further modified execution-monitoring unit 528 to be used in an alternative processor arrangement and configured to monitor executions of instructions by the PUO other than branch instructions.

The execution-monitoring unit 528 of FIG. 6 comprises all elements of the execution-monitoring unit 428 of FIG. 4, which are identified with identical reference signs. Additionally, the execution-monitoring unit 528 comprises an execution-monitoring processor 528.6. In the following only the execution-monitoring processor 528.6 will be explained. For a description of the other elements, the reader is referred to the above description of FIG. 4.

The execution-monitoring processor 528.6 receives the pre-generated execution pattern information 125 and the execution information 127, which comprise instruction addresses of executed instructions other than branch instructions. The execution-monitoring processor 528.6 is configured to compare an instruction address indicated by a given synchronization information element comprised within the execution information with at least one permitted instruction address range comprised within the pre-generated execution pattern information. Furthermore, according to a predetermined execution-anomaly criterion, an undesired deviation of the execution pattern comprised within the execution information 127 is detected if the instruction address of the executed instruction lies outside the at least one permitted instruction address range. An example, of a detection of an undesired deviation will be described in the following with reference to FIGS. 7A-7C.

Figures 7A, 7B:
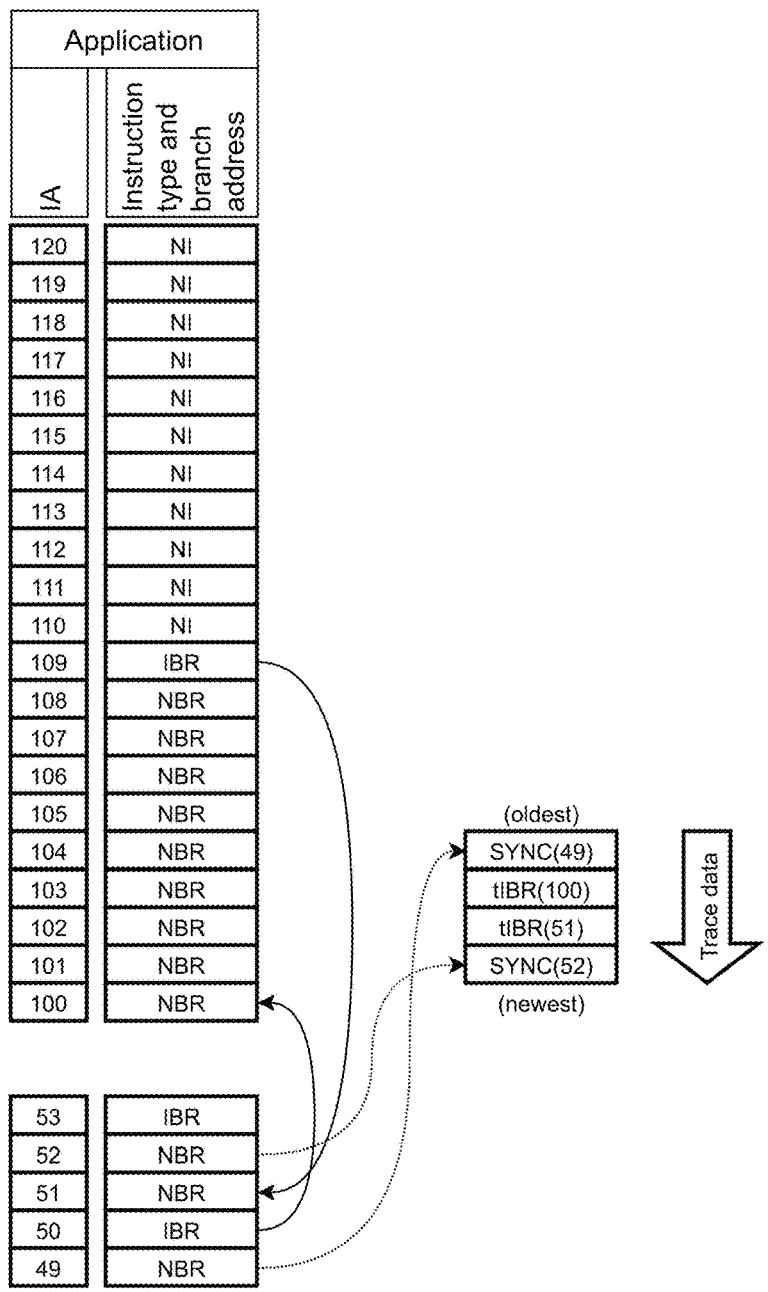

FIG. 7A shows a representation of an uncompromised version of an exemplary application program code executed by the PUO 102 of FIG. 1a.

Figure 7C:
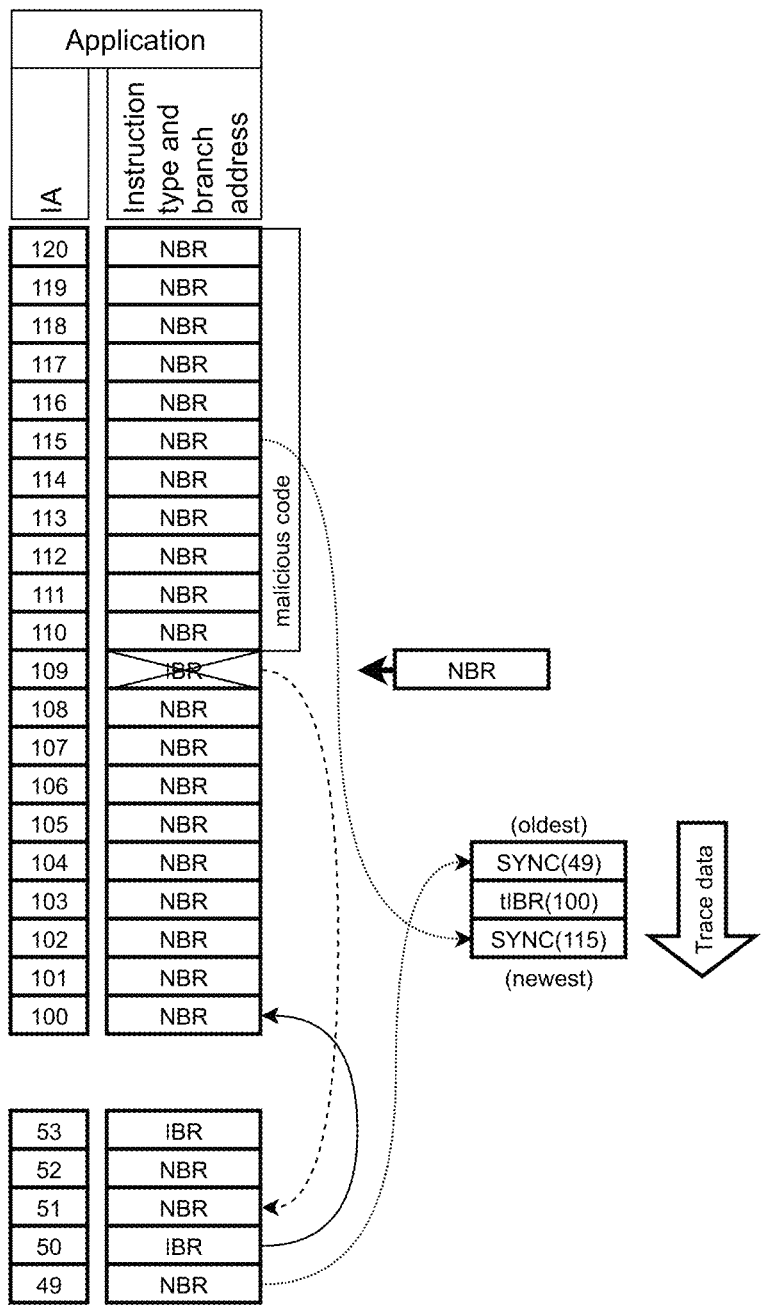
FIG. 7C shows a representation of a compromised version of the exemplary application program code shown in FIG. 7A.

The uncompromised version of the exemplary application program code is represented in form of a table labeled "Application". The table "Application" comprises two columns labeled "IA" and "Instruction type+branch address". The column "IA" is a list of the instruction addresses of the instructions comprised by the application program code. The column "Instruction type+branch address", hereinafter also referred to as "instruction type", indicates for each instruction address an instruction type of the instruction associated with the instruction address. Relevant instruction types for the example shown in FIGS. 7A-C are indirect branch instruction ("IBR"), no branch instruction ("NBR"), and not initialized ("NI") for those instruction addresses which are not associated to an instruction.

As shown in column "IA", the instruction addresses are associated with two address ranges. A first range extends from instruction address "49" to instruction address "52" and a second range extends from instruction address "100" to instruction address "120", wherein the first range corresponds to a main part of the application program code and the second range to a function associated with the application program code. The two ranges are connected by an indirect branch instruction at instruction address "50", which when executed leads to a jump to instruction address "100". The execution of an indirect branch instruction at instruction address "109" leads to a return to the instruction address "51" of the first range of instruction addresses. Consequently, in this uncompromised version of the application program code, instructions corresponding to instruction addresses following the indirect branch instruction at instruction address "109" will never be executed by the PUO 102.

A part of a trace-data stream generated by the trace unit 106 of the PUO 102 during execution of the uncompromised version of the exemplary application program code is shown to the right of table "Application". The trace-data stream comprises, in an order of arrival at the cybersecurity-monitoring engine 120, an instruction-synchronization message labeled "SYNC", which is indicative of execution of the instruction associated with instruction address "49". Furthermore, the trace-data stream comprises two consecutive branch messages indicative of the execution of two indirect branch messages with a jump-in instruction address "100" and a jump-in instruction address "51", respectively, which correspond to the indirect branch instructions at instruction address "50" and instruction address "109". Based on the uncompromised version of the exemplary application program code, a hash table was generated for inclusion into the pre-generation execution pattern information 125, which will be described in the following with reference to FIG. 7B.

FIG. 7B shows parts of the pre-generated execution pattern information generated from the application program code shown in FIG. 7A.

FIG. 7B shows a table label "Buckets", which is part of a hash table comprised within the pre-generated execution pattern information. The columns 1-3 and 5 of table "Buckets" are identical to those of the hash table shown in FIG. 5A. Therefore, the reader is referred to the description of FIG. 5A for a detailed description of their significance.

The fourth column labeled "end of range" of table "Buckets" is an implementation of the column "(optional) parameter for specific policies" of the hash table shown in FIG. 5A. The column "end of range" indicates the end of a range of instruction address associated to instructions other than branch instruction executed by the PUO 102 subsequently to the execution of the respective branch instruction.

A first entry of table "Buckets" corresponds to the indirect branch instruction at instruction address "50" while a second entry corresponds to the indirect branch instruction at instruction address "109". Due to "golden" system runs with the uncompromised version of the application program code, the jump-in instruction address of the two indirect branch instructions could be identified. Moreover, the end of range for the branch instructions is given by the instruction address "109" and instruction address "53", respectively. A third entry of the table "Buckets" corresponds to the indirect branch instruction associated with instruction address "53". Labels "??" indicate that conducted "golden" system runs did not suffice to determine the jump-in instruction address and the end of range. How the instruction addresses indicated by the column "end of range" are used by the execution-monitoring processor 528.6 to identify malicious code executed by the PUO 102 will be described in the following with reference to FIG. 7C.

FIG. 7C shows a representation of a compromised version of the exemplary application program code shown in FIG. 7A.

The compromised version of the exemplary application program code is represented in a table labeled "Application" in FIG. 7C. The table "Application" is identical to that of FIG. 7A, except for two changes. In the compromised version of the exemplary application program code, an attacker has modified the indirect branch instruction associated with instruction address 109 by replacing it with a no branch instruction indicated by "NBR". This removal of the branch instruction enables the execution of previously not executable instructions with instruction addresses in the range from "110" to "120". Furthermore, the attacker added a malicious code by associating instructions with the initially uninitialized range of instructions following instruction addresses from "110" to "120". However, such a modification is detected by the cybersecurity-monitoring engine, which will be explained in the following with reference to a trace-data stream which is generated during the execution of the exemplary application program code and shown on a left-hand side of the table "Application" of FIG. 7C.

The trace-data stream shown in FIG. 7C comprises three messages. The first two messages are identical to the trace-data stream of FIG. 7A. However, due to the replaced indirect branch instruction at instruction address "109", the branch message indicative of the indirect branch instruction with the jump-in address "51" is missing in the trace-data stream. Instead, a synchronization message indicative of instruction address "115" follows as a third trace message in the trace-data stream.

The execution-monitoring processor 528.6 receives the instruction-synchronization message "SYNC(49)". At this point in the execution of the compromised version of the exemplary application program code, no "end of range"-policy has to be enforced yet. As a result, the monitoring-output signal 130 is not provided and the PUO 102 continues to execute the application program code unhindered.

In the following, the cybersecurity-monitoring engine 120 receives the branch message "tIBR(100)". From this branch message, the trace-data-processing unit 126 determines the jump-in instruction address to be "100" and jump-out instruction address to be "50". The jump-in and the jump-out instruction address are forwarded as part of the execution information 127 to the execution-monitoring processor 428.2. Using a hash table comprising the table "Buckets" of FIG. 7B, the execution-monitoring processor 428.2 determines that the executed branch instruction is part of the uncompromised version of the exemplary application program code. As a result, the monitoring-output signal is not provided. Nevertheless, the execution-monitoring processor 428.2 provides the "end of range" instruction address "109" given in table "Buckets" of FIG. 7B to the execution-processor 428.6.

Afterwards, the cybersecurity-monitoring engine 120 receives the instruction-synchronization message "SYNC (115)". The trace-data-processing unit 126 determines from the trace message the instruction address "115" of the executed instruction and passes this information as part of the execution information 127 on to the execution-monitoring processor 428.6. The execution-monitoring processor 428.6 finds that the instruction address "115" lies beyond the instruction address "109" indicative of the "end of range". As a result, the execution-monitoring processor 428.6 provides the monitoring-output signal 130 indicative of the detection violation of the policy.

The table "Buckets" of FIG. 7B comprises information about ranges that instruction addresses of executed instructions have to lie in. However, other embodiments of the table "Buckets", which are not shown here, additionally or alternatively include policies to be enforced such as an order in which instructions are to be executed.

The execution-monitoring units 428 and 528 are particularly suited to detect branch instruction that are not part of the uncompromised version of a given application program code or to detect instructions that are executed in an unexpected order. An additional or alternative approach to detect execution of malicious code is to monitor a number of times a loop is executed by the PUO 102.

Figure 8:
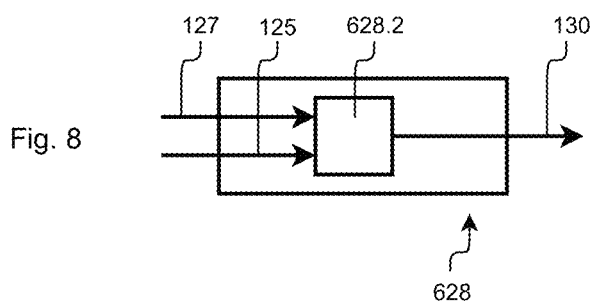
FIG. 8 shows an execution-monitoring unit, which is configured to monitor the number of executions of a loop comprised within a given application program code.

FIG. 8 shows an execution-monitoring unit 628, which is configured to monitor the number of executions of a loop comprised within a given application program code.

Application program codes often include branch instructions referred to as loops, which are executed a plurality of times. To monitor the number of times a loop is executed, the execution-monitoring unit 628 additionally comprises the execution-monitoring processor 628.2. The execution-monitoring processor 628.2 receives the execution information 127 and the pre-generated execution pattern information 125. The pre-generated execution information comprises information about an allowed maximum number of executions of a loop. Operation of the execution-monitoring processor 628.2 will be explained using an exemplary application program code pre-generated execution pattern information comprising information about an allowed number of executions of a loop shown in FIG. 9.

Figure 9:
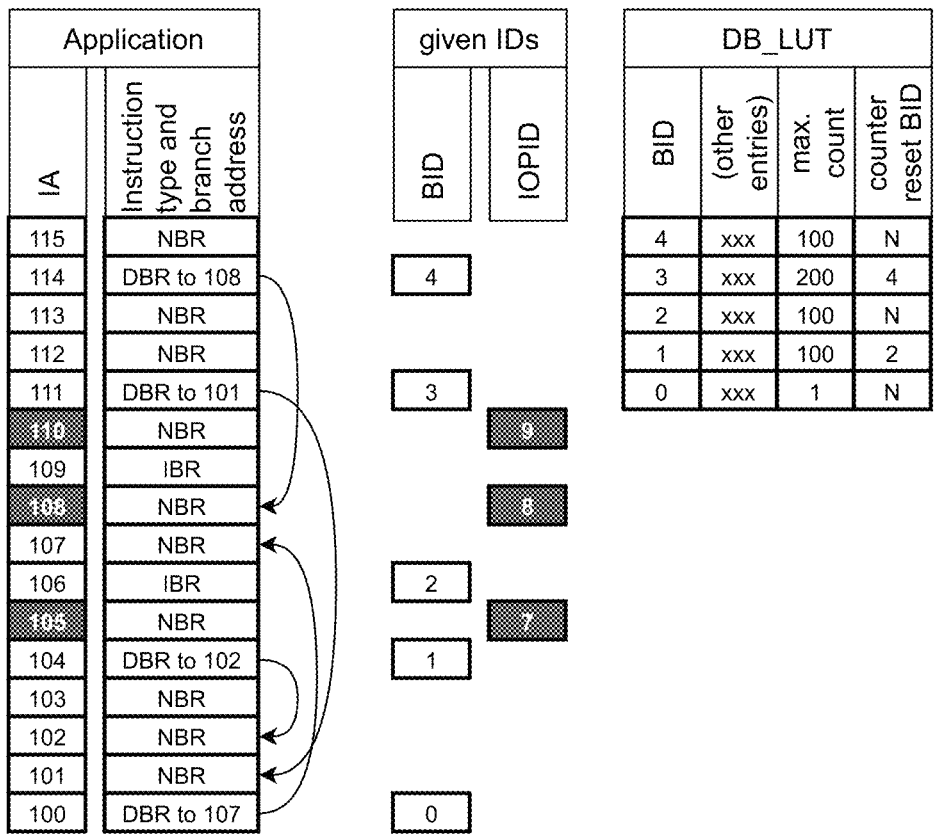
FIG. 9 shows an uncompromised version of an exemplary application program code and corresponding pre-generated execution pattern information comprising information about an allowed number of executions of a loop.

FIG. 9 shows an uncompromised version of an exemplary application program code and corresponding pre-generated execution pattern information comprising information about an allowed number of executions of a loop.

FIG. 9 shows three tables labeled "Application", "given IDs", and "DB_LUT". The table "Application" is a representation of the uncompromised version of the exemplary application program code, wherein in a column labeled "IA" the instruction addresses of the application program code are given and a column labeled "Instruction type+branch address", hereinafter referred to as column "instruction type", indicates for each instruction address a corresponding type of instruction.

From column "IA" of table "Applications" it can be seen that the exemplary application program code comprises 16 instructions associated with the instructions addresses "100" to "115". The column "instruction type" indicates that the instruction addresses correspond to three types of instructions: direct branch instructions ("DBR"), indirect branch instructions ("IBR"), and no branch instruction ("NBR"). Direct branch instructions are associated with instruction addresses "100", "104", "111", and "114". An indirect branch instruction is associated to the instruction address "106". Column "instruction type" also indicates a jump-in instruction address for each direct branch instruction. The jump-out and the jump-in instruction address of each direct branch instruction is also visualized by arrows shown to the right of column "instruction type". For indirect branch instructions, a jump-in instruction address is not given, since the jump-in instruction address of indirect branch instructions is only known at runtime.

The table "given IDs" assigns unique identifies to branch instructions and other instructions. With regard to the execution-monitoring processor 628.8, only a column labeled "BID" of table "given IDs" is relevant. The column "BID" uniquely assigns a branch identifier (BID) to each instruction address corresponding to a branch instruction. The branch identifier ranges from "0" to "4", wherein the branch identifiers are assigned to the instruction addresses in ascending order.

Lastly, the table "DB_LUT" is that part of the pre-generated execution pattern information that assigns each branch instruction, indicated by a column labeled "BID" of table "DB_LUT" an upper limit for the number of repetitive executions and a counter-reset instruction. Furthermore, a column labeled "counter reset BID" assigns to each branch instruction a counter-reset branch instruction, which indicates that when the counter-reset branch instruction is executed, the current count of the repetitive executions of the respective branch instruction has to be set to zero. The counter-reset branch instructions allows, for example, the execution of nested loops. In other embodiments of the execution-monitoring unit 628 is not required.

With regard to the exemplary application program code given in table "Application", column "max count" indicates that for the branch instruction with the BID "0" the upper limit of the number of repetitive executions is 1. Moreover, for the branch instruction with the BID "1", "2", and "4", the upper limit is 100, while for the branch instruction with the BID "3" the upper limit is 200. A counter-reset branch instruction is only given for the branch instructions associated with the BIDs "1" and "3". An entry "N" indicates that an counter-reset branch instruction is not given for the other branch instructions.

Using the table "DB_LUT", the execution-monitoring processor 628.8 is configured to determine from the execution information a current count of the repetitive executions of a given branch instruction executed by the PUO 102 and to compare the current count with the maximum count given in column "max count" of table "DB_LUT". If the current count surpasses the maximum count given in column "max count", the execution-monitoring processor 628.8 is configured to provide the monitoring-output signal indicative of the violation of the maximum number of executions of the given branch instruction. Furthermore, the execution-monitoring processor 628.8 is configured to reset the current count of all branch instructions whose counter-reset branch instruction is identical to the given branch instruction.

In other embodiments, the pre-generated execution pattern information 125 comprises an upper limit of the number of consecutively executed ("taken") branch instructions by the PUO 102. In this embodiment, the execution-monitoring unit is configured to determine from the retrieved execution information a current count of consecutively executed branch instructions, and to compare the current count with the upper limit. Moreover, the predetermined execution-anomaly criterion defines as the undesired deviation an exceeding of the upper limit by the number of consecutively executed branch instructions. In other alternative embodiments, the pre-generated execution pattern information 125 comprises an upper limit of the number of consecutively not executed ("not taken") branch instructions by the PUO 102.

Besides identifying execution of malicious code by monitoring the number of executions of branch instructions, it is also possible to identify execution of malicious code monitoring the jump-out instruction addresses and jump-in instruction addresses of call instructions and return instructions. An alternative embodiment of the execution-monitoring unit 128 that performs such a monitoring will be described in the following with reference to FIG. 10.

Figure 10:
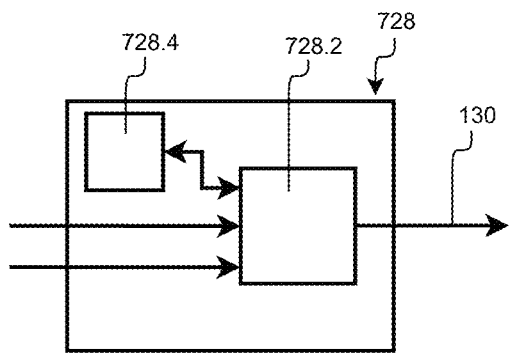
FIG. 10 shows an execution-monitoring unit, which is configured to monitor the jump-out instruction address and the jump-in instruction address of call instructions and return instructions.

FIG. 10 shows an execution-monitoring unit 728, which is configured to monitor the jump-out instruction address and the jump-in instruction address of call instructions and return instructions.

Identical to the execution-monitoring unit 128 of FIG. 1*a*, the execution-monitoring unit 728 receives the pre-generated execution pattern information 125 provided by the memory unit 124 and the execution information 127 provided by the observation-input interface 122.

The execution-monitoring unit 728 comprises an execution-monitoring processor 728.2, which receives both the pre-generated execution pattern information 125 and the execution information 127. Moreover, the execution-monitoring processor 728.2 is connected to a call-stack memory 728.4.

For each call instruction identified in the execution information 127 as executed by the PUO 102, the execution-monitoring processor 728.2 is configured to store that instruction address immediately following, in an order of execution of the application program code, the jump-out instruction address associated with the call instruction as return-instruction address into the call-stack memory unit 728.4.

Furthermore, for each return instruction identified in the execution information 127 as executed by the PUO 102, the execution-monitoring processor 728.2 is configured to perform a comparison between the jump-in instruction address associated with the return instruction and return-instruction address stored last in the call-stack-memory unit 728.4.

If the return-instruction address last stored, i.e. the instruction address on top of the stack, and the jump-in instruction address are identical, the return-instruction address is removed from the call-stack-memory unit 728.4 and the monitoring-output signal 130 is not provided. However, if the return-instruction address last stored and the jump-in instruction address are not identical, an execution anomaly was found, and the execution-monitoring processor 728.2 is configured to provide the monitoring output signal 130 indicative of the detected execution anomaly.

The different embodiments of the execution-monitoring processors displayed in FIGS. 4, 6, 8, and 10 can also be used in combination. Moreover, the functionality of the execution-monitoring processors of FIGS. 4, 6, 8, and 10 can also be integrated into a single processor.

Finally, an alternative embodiment of the processor arrangement 100 of FIG. 1*a* will be described with reference to FIG. 1*a*.

Figure 11:
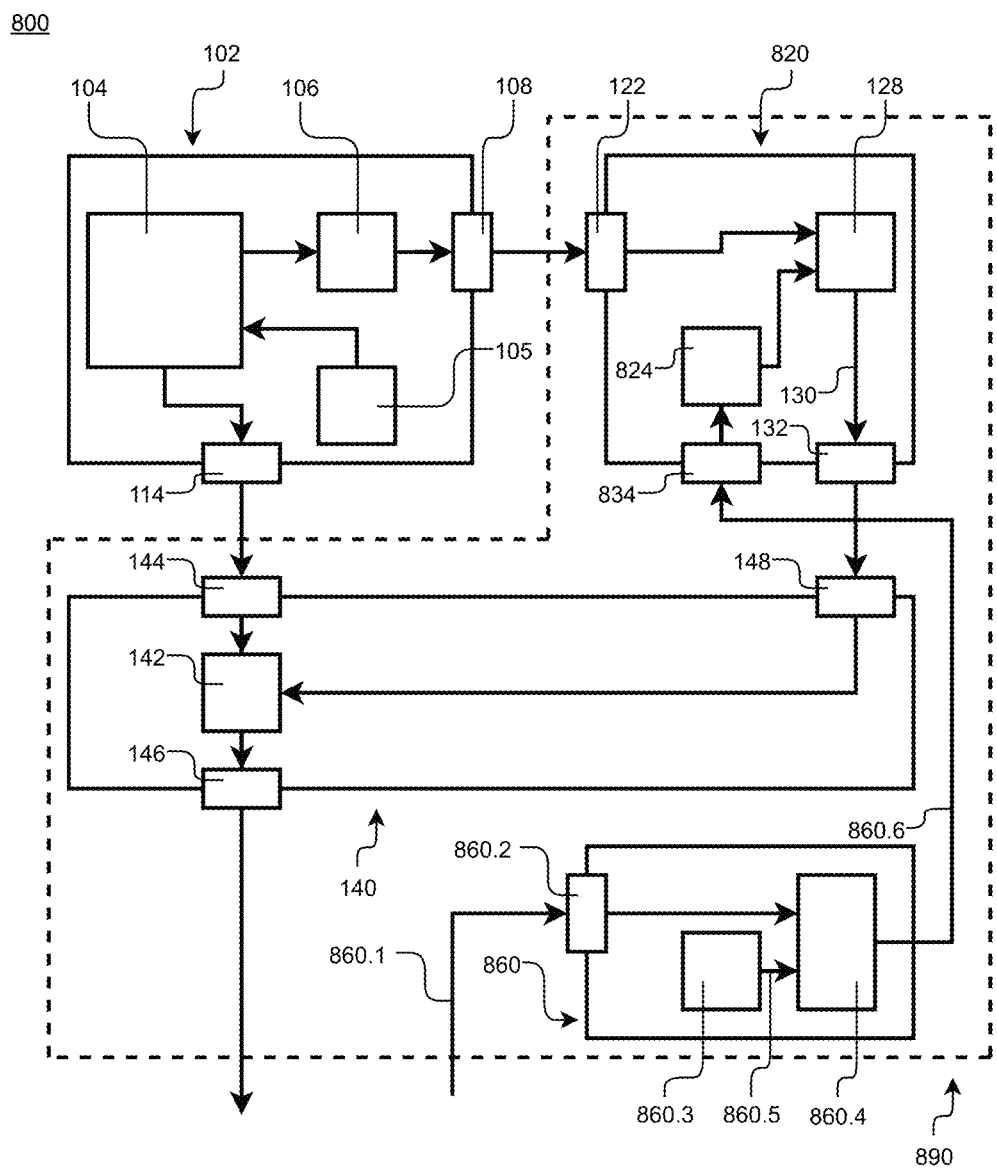
FIG. 11 shows an alternative embodiment of the processor arrangement of FIG. 1a, which is configured to securely update the pre-generated execution pattern information.

FIG. 11 shows an alternative embodiment of the processor arrangement of FIG. 1*a*, which is configured to securely update the pre-generated execution pattern information.

Features of the processor arrangement 800 that are identical to those of the processor arrangement 100 are labeled using the same reference signs. For an explanation of those features, the reader is referred to the description of FIG. 1*a*. In the following, only those features that are unique to the processor arrangement 800 will be explained.

To perform a secure update of the pre-generated execution-pattern information 127, the processor arrangement 800 comprises an alternative embodiment of the cybersecurity-protection unit. The cybersecurity-protection unit 890 of FIG. 8 comprises a cybersecurity-monitoring engine 820, the controllable latency-output-buffer unit 140, and a secure-update unit 860.

The secure-update unit 860 receives an update file 860.1 via an update-file interface 860.2. To validate, whether the received update file stems from a trusted source, the secure-update unit 860 comprises a secure-update processor 860.4. The secure-update processor 860.4 receives the secure-update file 860.1 and update-validation information 860.5 stored in an update-information memory 860.3 and is configured to verify, using the update-validation information, that the received update file 860.1 stems from a trusted update provider. To this end, the secure-update processor 860.4 uses a cryptographic hash-based verification method. However, also other method for verification of the update file 860.1 can be used.

If the secure-update processor 860.4 verifies that the update file 860.1 stems from a trusted source, the secure-update processor 860.4 is configured to extract and provide revised pre-generated execution-pattern information 860.6 from the update file 860.1.

The revised pre-generated execution-pattern information 860.6 are received via an update-file interface 834 by a memory unit 824, which is part of the cybersecurity-monitoring engine 820. The memory unit 824 is configured to store the revised pre-generated execution-pattern information 860.6 and provide the revised pre-generated execution-pattern information 860.6 to the execution-monitoring unit 128.

In other embodiments of the processor arrangement not shown here that are based on the processor arrangement 800, the secure-update unit 860 is used to additionally or alternatively update other information required for the operation of the cybersecurity-protection unit, e.g., the execution-anomaly criterion associated to the pre-determined execution pattern information, a firmware of the cybersecurity-monitoring engine or a firmware of the latency-output-buffer unit.

The invention claimed is:

1. A processor arrangement, comprising:
a processor under observation (PUO), comprising:
processing circuitry configured to execute an application program code stored in a processor memory and to provide application output data via an output interface and, in executing the application program code, to execute or not execute instructions in accordance with an execution pattern depending on the executed application program code; and
observation circuitry that is connected to the processing circuitry and configured to monitor execution of the application program code by the processing circuitry and to provide execution information indicative of the execution pattern associated with the execution of the application program code by the PUO;
cybersecurity-monitoring circuitry for observing the PUO, which is physically separated from the PUO, and inaccessible by the PUO when executing the application program code, the cybersecurity-monitoring circuitry comprising:
an observation input interface for receiving the execution information;
a memory configured to store pre-generated execution pattern information indicative of an expected execution pattern associated with an uncompromised version of the application program code executed by the PUO; and
execution-monitoring circuitry, which is configured to:
perform a comparison between the received execution information and the pre-generated execution pattern information,
detect, using a predetermined execution-anomaly criterion defining at least one undesired deviation of the received execution information from the pre-generated execution pattern information, an execution anomaly in the received execution information, and
provide a monitoring output signal indicative of the detected execution anomaly; and
a controllable latency-output-buffer, which is also physically separated from the PUO, and inaccessible by the PUO when executing the application program code, and comprises a buffer memory and which receives at least a part of the application output data of the PUO and the monitoring output signal, and which is configured to:
temporarily store the received application output data in the buffer memory for a pre-determined latency time span;
output the temporarily stored application output data from the buffer memory at the end of the latency-time span, if no monitoring output signal indicative of the detected execution anomaly has been received during the latency time span; and
to block at least a part of the output from the buffer memory as soon as the monitoring output signal indicative of the detected execution anomaly has been received.

2. The processor arrangement according to claim 1, wherein the observation circuitry of the PUO is configured to generate and provide, via a trace interface, a trace-data stream, which comprises the execution information, and wherein the cybersecurity-monitoring circuitry further comprises:
a trace communication input interface for receiving the trace-data stream; and
trace-data-processing circuitry configured to retrieve the execution information from the received trace-data stream.

3. The processor arrangement according to claim 2, wherein
the trace-data stream comprises the execution information in the form of compressed trace data, and
the trace-data processing circuitry comprises control-flow-reconstruction circuitry that is configured to decompress the trace data.

4. The processor arrangement according to claim 2, wherein
the trace-data-processing circuitry is configured to identify, using the retrieved execution information, a respective jump-out instruction address of those branches associated with executing a call instruction and a respective jump-in instruction address of those branches associated with executing a return instruction, and
the execution-monitoring circuitry additionally comprises a call-stack memory and is configured to:
store return-instruction-address information indicative of that instruction address immediately following, in an order of execution of the application program code, the identified jump-out instruction address in the call-stack memory;
perform a comparison between the identified jump-in instruction address and the instruction address indicated by the return-instruction-address information,
wherein the predetermined execution-anomaly criterion defines a deviation of the identified jump-in instruction address from the instruction address indicated by the return-instruction-address information as a further execution anomaly; and
provide, upon detecting the further execution anomaly, the monitoring-output signal indicative of the detected further execution anomaly.

5. The processor arrangement according to claim 1, wherein the latency time span is a fixed value.

6. The processor arrangement according to claim 1, wherein the execution-monitoring circuitry is additionally configured to output a buffer-synchronization signal upon completing the comparison to indicate the end of the latency-time span, and
the latency-output-buffer receives the buffer-synchronization signal and is configured to output the temporarily stored application output data from the buffer memory upon receiving the buffer-synchronization signal, if no monitoring output signal indicative of the detected execution anomaly has been received before receiving the buffer-synchronization signal.

7. The processor arrangement according to claim 1, wherein
the execution information is indicative of a jump-in instruction address of at least one given executed branch instruction,
the pre-generated execution pattern information is indicative of at least one permitted jump-in instruction address, and
the predetermined execution-anomaly criterion defines an executed branch instruction of the retrieved execution information whose jump-in instruction address is not among the permitted jump-in instruction addresses as the undesired deviation.

8. The processor arrangement according to claim 1, wherein
the execution information indicates an association of an observed jump-out instruction address to an observed jump-in instruction address for at least one branch instruction executed by the PUO during execution of the application program code,
the pre-generated execution pattern information stored in the memory comprises at least one association of an expected jump-out instruction address to an expected jump-in instruction address, and
the execution-anomaly criterion defines an executed branch instruction to be the undesired deviation if the association of the observed jump-out instruction address to the observed jump-in instruction address of the execution information is not comprised within the pre-generated execution pattern information.

9. The processor arrangement according to claim 1, wherein
the execution information comprises a synchronization information element that is indicative of an instruction address associated to an instruction executed by the PUO during the execution of the application program code,
the pre-generated execution pattern information is indicative of at least one permitted instruction address range, and
the predetermined execution-anomaly criterion defines as the undesired deviation that the instruction address of the executed instruction is outside the at least one permitted instruction address range.

10. The processor arrangement according to claim 1, wherein
the execution information is indicative of a jump-in instruction address or a jump-out instruction address of at least one given executed branch instruction,
the pre-generated execution pattern information comprises at least one range of jump-out instruction addresses or at least one range of jump-in instruction addresses, and
the predetermined execution-anomaly criterion defines an executed branch instruction of the retrieved execution information whose jump-out instruction address does not fall within the at least one range of jump-out instruction addresses or whose jump-in instruction address does not fall within the at least one range of jump-in instruction addresses the undesired deviation.

11. The processor arrangement according to claim 1, wherein
the execution information is indicative of an order in which instructions of the application program code were executed by the PUO,
the pre-generated execution pattern information is indicative of an expected order in which instructions are expected to be executed by the PUO, and
the predetermined execution-anomaly criterion defines as the undesired deviation a deviation of the order indicated by the execution information from the expected order.

12. The processor arrangement according to claim 1, wherein
the execution information is indicative of a number of consecutive executions of at least one branch instruction by the PUO,
the pre-generated execution pattern information comprises an upper limit of the number of consecutive executions of a given branch instruction by the PUO,
the execution-monitoring circuitry is configured to determine from the received execution information a current count of the consecutive executions of the given branch instruction, and to compare the current count with the upper limit, and
the predetermined execution-anomaly criterion defines as the undesired deviation an exceeding of the upper limit by the number of consecutive executions of the given branch instruction.

13. The processor arrangement according to claim 1, wherein
the pre-generated execution pattern information comprises an upper limit of the number of consecutively executed branch instructions by the PUO,
the execution-monitoring circuitry is configured to determine from the received execution information a current count of consecutively executed branch instructions, and to compare the current count with the upper limit, and
the predetermined execution-anomaly criterion defines as the undesired deviation an exceeding of the upper limit by the number of consecutively executed branch instructions.

14. The processor arrangement according to claim 1, wherein
the execution information is indicative of a number of repetitive executions of at least one branch instruction by the PUO,
the pre-generated execution pattern information comprises an upper limit of the number of repetitive executions of a given branch instruction by the PUO and a counter-reset instruction address for the given branch instruction, the counter-reset instruction address being associated with a predetermined further branch instruction that is reached by the PUO after reaching the given branch instruction,
the execution-monitoring circuitry is configured to determine from the received execution information a current count of the repetitive executions of the given branch instruction, to compare the current count with the upper limit, and to reset the current count immediately after the counter-reset instruction has been reached by the PUO, and
the predetermined execution-anomaly criterion defines as the undesired deviation an exceeding of the upper limit by the current count of repetitive executions of the given branch instruction.

15. The processor arrangement according to claim 1, further comprising secure-update circuitry, comprising:
an interface to receive an update file comprising updated pre-generated execution pattern information generated by a trusted update provider; and
an update information memory storing update validation information,
wherein the secure-update circuitry is configured to:
verify that the received update file stems from the trusted update provider using the update validation information; and
only replace the pre-generated execution pattern information with the updated pre-generated execution pattern information, if the verification indicates that the update file stems from the trusted source.

* * * * *